United States Patent
Kang et al.

(10) Patent No.: US 7,668,504 B2
(45) Date of Patent: Feb. 23, 2010

(54) SCANNING APPARATUS AND METHOD IN A MULTI-HOP RELAY BROADBAND WIRELESS ACCESS COMMUNICATION SYSTEM

(75) Inventors: Hyun-Jeong Kang, Seoul (KR); Pan-Yuh Joo, Seoul (KR); Jung-Je Son, Seongnam-si (KR); Jae-Wong Cho, Suwon-si (KR); Hyoung-Kyu Lim, Seoul (KR); Yeong-Moon Son, Anyang-si (KR); Sung-Jin Lee, Seoul (KR); Mi-Hyun Lee, Seoul (KR); Song-Nam Hong, Seoul (KR); Young-Ho Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 516 days.

(21) Appl. No.: 11/519,610

(22) Filed: Sep. 12, 2006

(65) Prior Publication Data
US 2007/0060048 A1    Mar. 15, 2007

(30) Foreign Application Priority Data
Sep. 13, 2005    (KR)    ...................... 10-2005-0085418

(51) Int. Cl.
*H04B 7/15*    (2006.01)

(52) U.S. Cl. ..................................... 455/11.1; 465/436
(58) Field of Classification Search ................ 455/7, 455/11.1, 13.1, 436, 443, 444
See application file for complete search history.

(56) References Cited

U.S. PATENT DOCUMENTS

| 2004/0192204 A1 * | 9/2004 | Periyalwar et al. ............ 455/25 |
| 2006/0052066 A1 * | 3/2006 | Cleveland et al. ........... 455/101 |

FOREIGN PATENT DOCUMENTS

| KR | 100605131 | 7/2006 |
| KR | 1020060097497 | 9/2006 |
| KR | 1020060132422 | 12/2006 |
| WO | WO 2005/067225 | 7/2005 |

* cited by examiner

*Primary Examiner*—Tu X Nguyen
(74) *Attorney, Agent, or Firm*—The Farrell Law Firm, LLP

(57) ABSTRACT

A scanning apparatus and method in a multi-hop relay Broadband Wireless Access (BWA) communication system are provided. In the scanning method, a Mobile Subscriber Station (MSS) sends a scan request message requesting scanning to a Base Station (BS) via a Relay Station (RS). The BS sends a scan response message containing information for the scanning of the MSS to the MSS via the RS. The BS then sends a scan notify message indicating the scanning of the MSS to the RS.

29 Claims, 15 Drawing Sheets

SCANNING APPARATUS AND METHOD IN A MULTI-HOP RELAY BROADBAND WIRELESS ACCESS COMMUNICATION SYSTEM

PRIORITY

This application claims priority under 35 U.S.C. § 119 to an application filed in the Korean Intellectual Property Office on Sep. 13, 2005 and assigned Serial No. 2005-85418, the contents of which are incorporated herein by reference.

BACKGROUND OF THE INVENTION

1. Field of the Invention

The present invention relates generally to a multi-hop relay Broadband Wireless Access (BWA) communication system and, in particular, to a scanning apparatus and method in a multi-hop relay BWA communication system.

2. Description of the Related Art

Provisioning of services with diverse Quality of Service (QoS) levels at about 100 Mbps to users is an active study area for a future-generation communication system called a 4$^{th}$ Generation (4G) communication system. Particularly, active research is conducted on provisioning of high-speed service by ensuring mobility and QoS to a BWA communication system such as Wireless Local Area Network (WLAN) and Wireless Metropolitan Area Network (WMAN). Such major examples are Institute of Electrical and Electronics Engineers (IEEE) 802.16a and IEEE 802.16e.

The IEEE 802.16a and IEEE 802.16e communication systems are implemented by applying Orthogonal Frequency Division Multiplexing (OFDM)/Orthogonal Frequency Division Multiple Access (OFDMA) to physical channels of the WMAN system. IEEE 802.16a considers only a single-cell structure with no regard to mobility of a Subscriber Station (SS). In contrast, IEEE 802.16e supports SS mobility in the IEEE 802.16a communication system. A Mobile Subscriber Station is called an MSS.

FIG. 1 shows a typical IEEE 802.16e communication system configured in a multi-cell structure. The system includes cells 100 and 150, Base Stations (BSs) 110 and 140 for managing the cells 100 and 150, respectively, and a plurality of MSSs 111, 113, 130, 151 and 153. Signals are sent and received between the BSs 110 and 140 and the MSSs 111, 113, 130, 151 and 153 in OFDM/OFDMA. The MSS 130 exists in a cell boundary area between the cells 100 and 150, i.e. in a handover region. When the MSS 130 moves to the cell 150 managed by the BS 140 during signal transmission/reception to/from the BS 110, the serving BS of the MSS 130 changes from the BS 110 to the BS 140.

FIG. 2 shows signal flow between an MSS and a BS, for scanning in a conventional BWA communication system. An MSS 210 communicates with a serving BS 230 in step 211. During the communication, the MSS 210 determines whether to scan pilot channel signals from the serving BS 230 and neighbor BSs. If scanning should be performed, the MSS 210 sends a Mobile Scanning Interval Allocation Request (MOB_SCN-REQ) message to the serving BS 230 in step 213. The MOB_SCN-REQ message has the following configuration illustrated in Table 1 below.

TABLE 1

| Syntax | Size (bits) | Notes |
| --- | --- | --- |
| MOB_SCN-REQ_format( ) { | | |
|   Management Message Type=54 | 8 | — |
|   Scan duration | 8 | Units are frames |
|   Interleaving interval | 8 | Units are frames |
|   Scan iteration | 8 | In frames |
|   N_Recommended_BS | 8 | Number of neighboring BSs to be scanned |
|   For (i=0; i<N_Recommended_BS; i++) { | | |
|     Recommended BS_ID | 48 | BS Identifier |
|   } | | |
| } | | |

Referring to Table 1, the MOB_SCN-REQ message has a plurality of Information Elements (IEs). The IEs include "Management Message Type" identifying the type of the transmitted message, "Scan duration" indicating a desired scan duration during which pilot signals from the neighbor BSs are scanned, "Scan iteration" indicating the number of iterative scannings in the case of periodic scanning, "Interleaving interval" indicating the time interval between scannings in the case of iterative scanning, and "Recommended BS_ID" identifying a desired BS to be scanned.

Upon receipt of the MOB_SCN-REQ message, the serving BS 230 replies to the MSS 210 with a Mobile Scanning Interval Allocation Response (MOB_SCN-RSP) message containing scanning information for the MSS 210 and a scan duration set to non-zero.

The MOB_SCN-RSP message has the following structure.

TABLE 2

| Syntax | Size (bits) | Notes |
| --- | --- | --- |
| MOB_SCN-RSP_format( ) { | | |
|   Management Message Type=55 | 8 | — |
|   Scan duration | 8 | Units are frames. When Scan duration is set to zero, no scanning parameters are specified in the message. When MOB_SCN-RSP is sent in response to MOB_SCN-REQ, setting Scan duration to zero denies MOB_SCN-REQ. |
|   Report mode | 2 | 0b00: no report<br>0b01: periodic report<br>0b10: event triggered report<br>0b11: reserved; shall be set to zero |
|   reserved | 6 | Shall be set to zero |
|   Report period | 8 | Available when the value of Report mode is set to 0b01. Report period in frames. |
|   Report metric | 8 | Bitmap indicating metrics on which the corresponding triggers are based:<br>Bit 0: BS CINR mean<br>Bit 1: BS RSSI mean<br>Bit 2: Relative delay<br>Bit 3: BS RTD<br>Bit 4-7: reserved; shall be set to zero |
|   If (Scan duration!=0) { | | |
|     Start frame | 4 | — |
|     reserved | 4 | Shall be set to zero |
|     Interleaving interval | 8 | Duration in frames |
|     Scan iteration | 8 | — |

TABLE 2-continued

| Syntax | Size (bits) | Notes |
|---|---|---|
| N_Recommended_BS | 8 | Number of neighboring BSs to be scanned |
| for (i=0; i<N_Recommended_BS; i++) { | | |
| Recommended BS_ID | 48 | BS Identifier |
| } | | |
| } | | |
| } | | |

Referring to Table 2, the MOB_SCN-RSP message has a plurality of IEs. The IEs include "Management Message Type" identifying the type of the transmitted message, "Scan duration" indicating a scan duration during which the MSS is to scan, "Report mode", "Report period" used when the report mode is a periodic report, "Report metric" indicating the type of information to be reported as a scanning result, "Start frame" indicating the start of the scanning, "Scan iteration" indicating the number of iterative scannings in the case of periodic scanning, "Interleaving interval" indicating the time interval between scannings, and "Recommended BS_ID" identifying a desired BS to be scanned. If Scan duration is 0, it implies that the scanning request from the MSS is rejected. Information indicating the scanning result may be Carrier-to-Interference and Noise Ratio (CINR), Received Signal Strength Indicator (RSSI), relative delay, or Round Trip Delay (RTD).

Upon receipt of the MOB_SCN-RSP message containing the scanning information, the MSS 210 scans pilot channel signals from the serving BS 230 and the neighbor BSs in correspondence with the parameters included in the MOB_SCN-RSP message in step 217.

Meanwhile, the serving BS 230 discontinues data transmission to the MSS 210, buffering data for the MSS 210 during the scanning in the MSS 210 in step 219.

After the pilot scanning, the MSS 210 sends a Mobile Scanning Result Report (MOB_SCN-REP) message to the serving BS 230 to report the scanning result in step 221.

The MOB_SCN-REP message is configured in the following structure.

TABLE 3

| Syntax | Size (bits) | Notes |
|---|---|---|
| MOB_SCN-REP_format( ) { | | |
| Management Message Type=60 | 8 | — |
| Report mode | 1 | 0: Event triggered report<br>1: Periodic report |
| reserved | 7 | Shall be set to zero |
| Report metric | 8 | Bitmap indicating presence of certain metrics:<br>Bit 0: BS CINR mean<br>Bit 1: BS RSSI mean<br>Bit 2: Relative delay<br>Bit 3: BS RTD<br>Bit 4-7: reserved; shall be set to zero |
| N_BS | 8 | Number of BSs to be scanned |
| for (i=0; i<N_BS; i++) { | | |
| BS_ID | 48 | BS Identifier |
| Scanning result | 8 | This field contains the scanning result corresponding to Report metric (CINR/RSSI/Relative delay/RTD/etc. |
| } | | |
| } | | |

Referring to Table 3, the MOB_SCN-REP message has a plurality of IEs. The IEs include "Management Message Type" identifying the type of the transmitted message, "Report mode" indicating a mode in which the MSS reports the scanning result, "Report metric" indicating the type of information reported as a scanning result, "BS_ID" identifying a scanned BS, and "Scanning result" indicating the scanning result for the BS. "Scanning result" is included in the MOB_SCN-REP message according to the presence or absence of information to be reported. The scanning result may be CINR, RSSI, relative delay, or RTD.

In the typical IEEE 802.16e communication system, since signaling transmission/reception is carried out between a fixed BS and an MSS via a direct link, as shown in FIG. 2, a highly reliable radio communication link can be easily established between them. Yet, due to the fixed position of the BS, a radio network cannot be configured with flexibility. As a result, it is difficult to provide an efficient communication service in a radio environment with a fluctuating traffic distribution or a significant change in the number of calls.

To overcome the above shortcoming, a multi-hop relay data transmission scheme can be implemented through fixed Relay Stations (RSs), mobile RSs or general MSSs in a typical cellular wireless communication system such as the IEEE 802.16e communication system. The multi-hop relay wireless communication system may adaptively reconfigure a network quickly according to a communication environment change and efficiently operate the entire wireless network. Such a multi-hop relay wireless communication system also extends a cell service area and increases system capacity. In the case of a bad channel status between a BS and an MSS, an RS is installed between them, thus establishing a multi-hop relay path through the RS, so a good radio channel can be provided to the MSS. Also, with the use of the multi-hop relay in a cell boundary area with a bad channel state, a high-speed data channel can be provided and the cell service area can be expanded.

FIG. 3 shows a multi-hop relay wireless communication system which includes a BS 310, a plurality of MSSs 311, 313, 331 and 333, and an RS 320 for providing a multi-hop relay path between the BS 310 and an MSS. Signals are transmitted and received among the BS 310, the RS 320, and the MSSs 311, 313, 331 and 333 in OFDM/OFDMA. The BS 310 manages a cell 300, and the MSSs 311 and 333 within the coverage area of the cell 300 and the RS 320 can communicate directly with the BS 310. Yet, the MSSs 331 and 333 in an area outside the cell 300 cannot communicate directly with the BS 310. Thus, the RS 320 covers the area 330 and relays signals between the BS 310 and the MSSs 331 and 333. In this way, the MSSs 331 and 333 can send/receive a signal to/from the BS 310 via the relay 320.

As described above, in the multi-hop relay wireless communication system using an RS, an MSS can communicate with a BS via the RS or by a direct link. Therefore, services and functions available in legacy wireless communication systems must also be provided in the multi-hop relay wireless communication system.

Since the communication of the MSS is expanded to the BS and the RS in a multi-hop relay BWA communication system, the MSS must scan neighbor RSs as well as neighbor BSs, for active communications. Legacy systems give no considerations to the multi-hop relay scheme and thus there is no specified scanning method involving an RS. Accordingly, there exists a need for defining a signal procedure for scanning in an MSS in the multi-hop relay BWA communication system.

SUMMARY OF THE INVENTION

An object of the present invention is to substantially solve at least the above problems and/or disadvantages and to provide at least the advantages below. Accordingly, an object of the present invention is to provide an apparatus and method for transmitting and receiving signals for scanning via an RS in an MSS in a multi-hop relay BWA communication system.

Another object of the present invention is to provide an apparatus and method for transmitting and receiving necessary signals between an RS and a BS to support scanning in an MSS in a multi-hop relay BWA communication system.

The above objects are achieved by providing a scanning apparatus and method in a multi-hop relay BWA communication system.

According to one aspect of the present invention, in a communication method in an RS in a multi-hop relay cellular communication system, the RS transmits a scan request message received from an MSS to a BS. The RS then transmits a scan response message received from the BS to the MSS. The scan response message contains information for scanning the MSS.

According to another aspect of the present invention, in a communication method in an RS in a multi-hop relay cellular communication system, the RS determines, upon receipt of a scan request message from an MSS, a scanning schedule for the MSS based on information included in the scan request message and transmits a scan response message containing the determined scanning schedule information to the MSS.

According to a further aspect of the present invention, in a scanning method in a multi-hop relay cellular communication system, an MSS transmits a scan request message requesting scanning to a BS via an RS. The BS transmits a scan response message containing information for scanning of the MSS to the MSS via the RS. The BS transmits a scan notify message indicating the scanning of the MSS to the RS.

According to still another aspect of the present invention, in a scanning method in a multi-hop relay cellular communication system, an MSS transmits a scan request message requesting scanning to an RS. The RS transmits a scan response message containing information for scanning of the MSS to the MSS. The RS transmits a scan notify message indicating the scanning of the MSS to the BS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a signaling procedure for scanning neighbor BSs including a serving BS and neighbor RSs including a serving RS in an MSS in a multi-hop relay BWA communication system.

The multi-hop relay BWA communication system operates in OFDM or OFDMA. Hence, a physical channel signal is sent on a plurality of subcarriers, thereby enabling high-speed data transmission. Also, the multi-hop relay BWA communication system supports the mobility of MSSs by adopting a multi-cell structure.

An RS is a fixed or mobile node, or a particular system installed by the BS or a general SS. Any node having the above feature can be chosen as an RS according to a predefined rule for expansion of the cell area of a BS through a relay capabilities negotiation procedure with the BS.

While the following description is made in the context of a BWA communication system, it is to be clearly understood that the present invention is applicable to any cellular communication system as far as it uses a multi-hop relay scheme.

Figure 1:
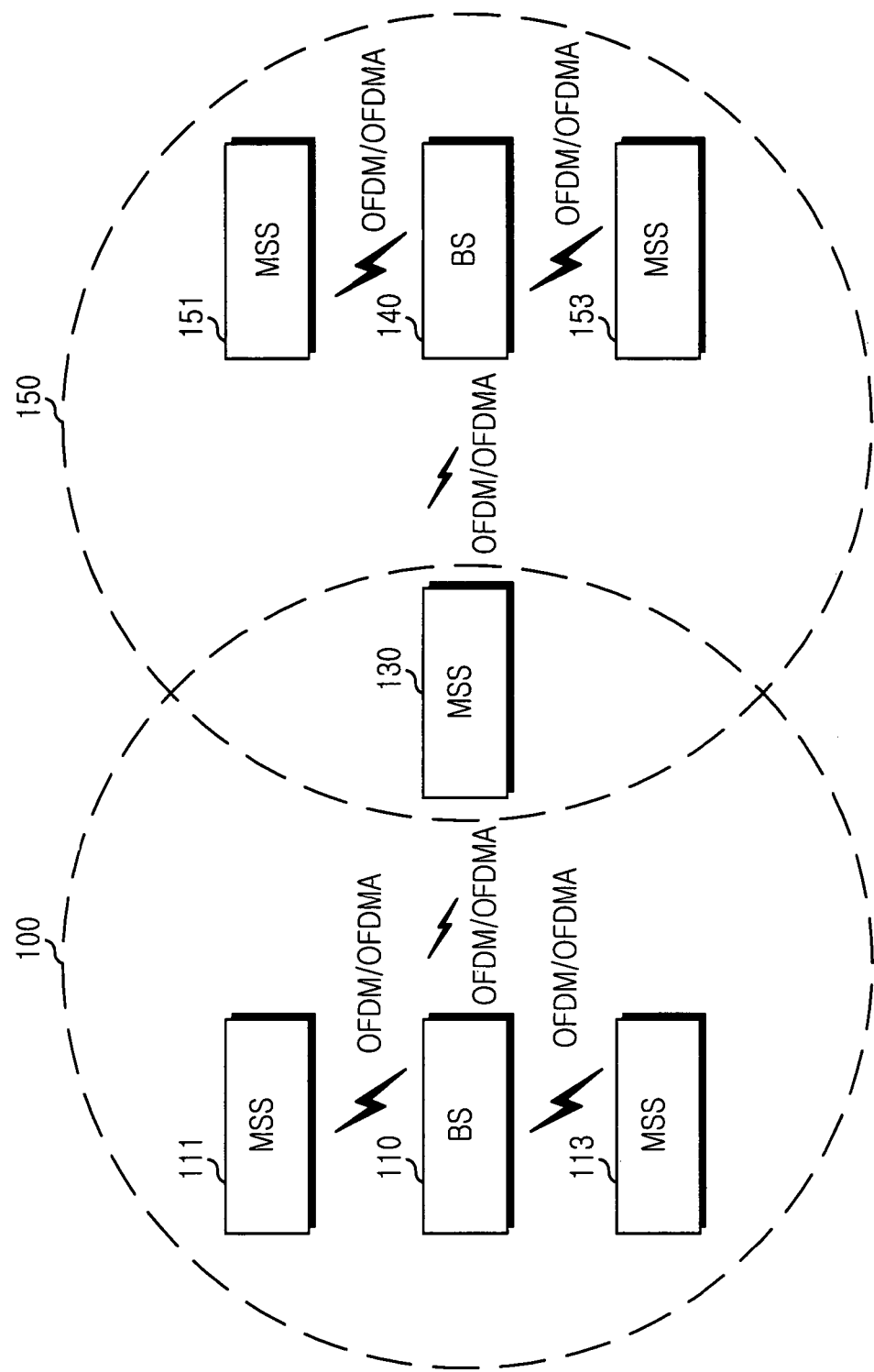
FIG. 1 illustrates the configuration of a typical IEEE 802.16e communication system.
Figure 2:
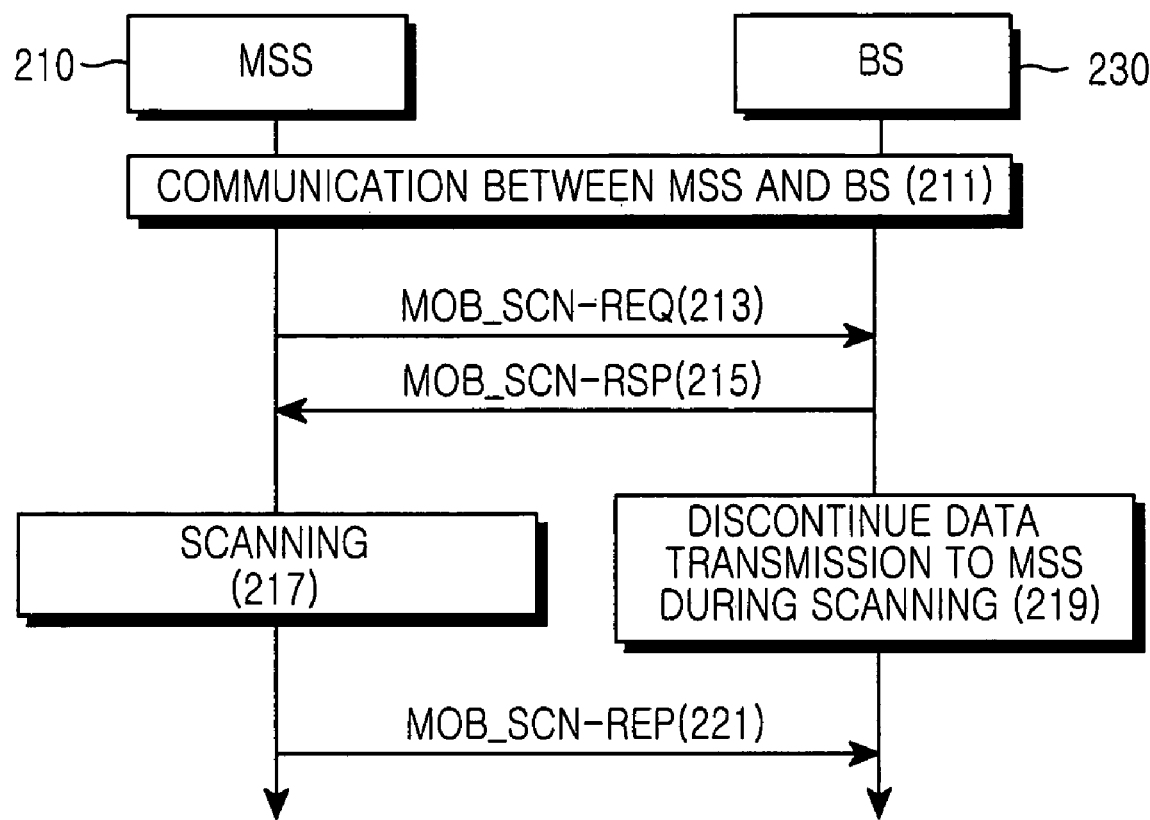
FIG. 2 is a diagram illustrating a signal flow between an MSS and a BS, for scanning in a conventional BWA communication system.
Figure 3:
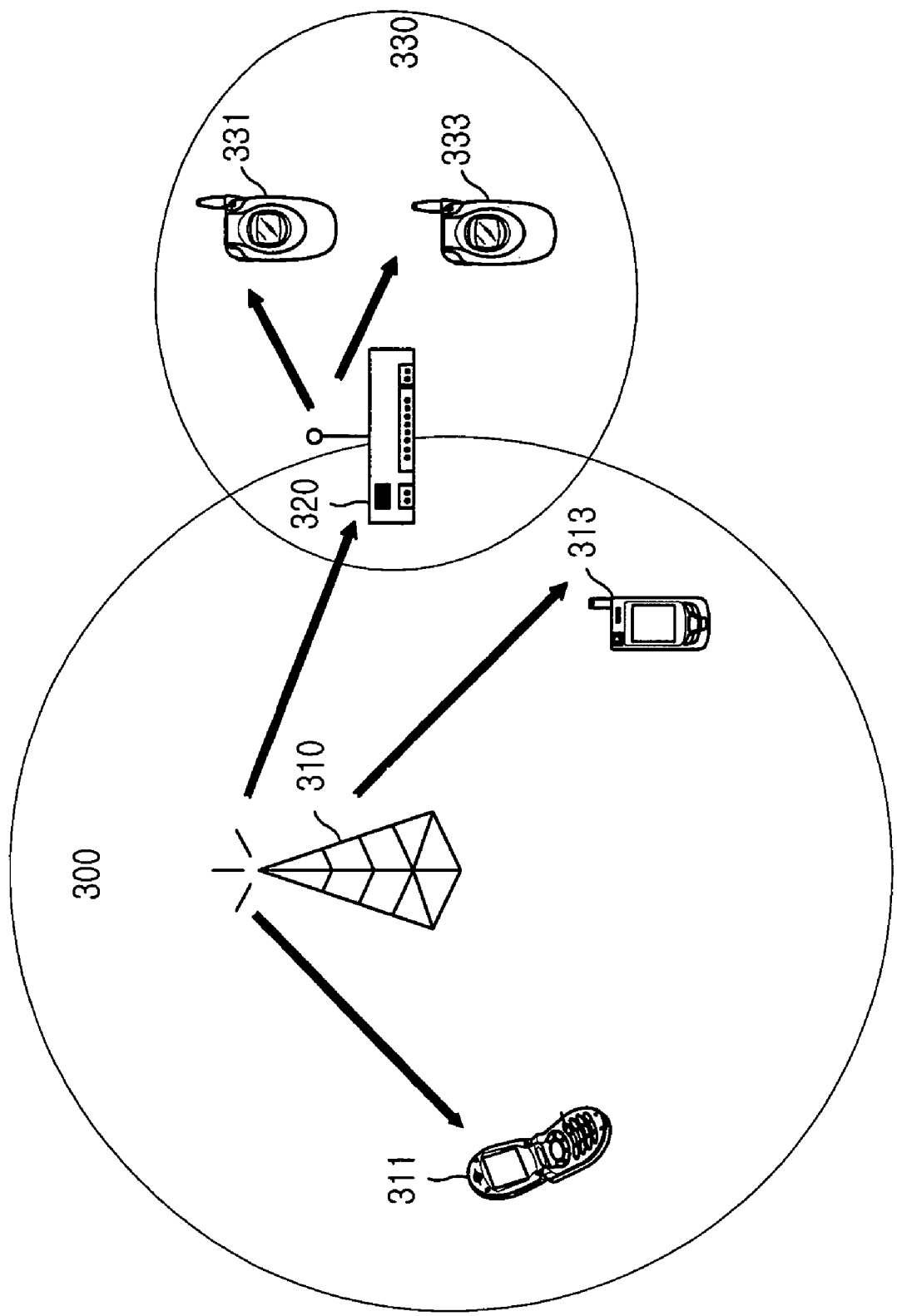
FIG. 3 illustrates the configuration of a multi-hop relay wireless communication system according to the present invention.
Figure 4:
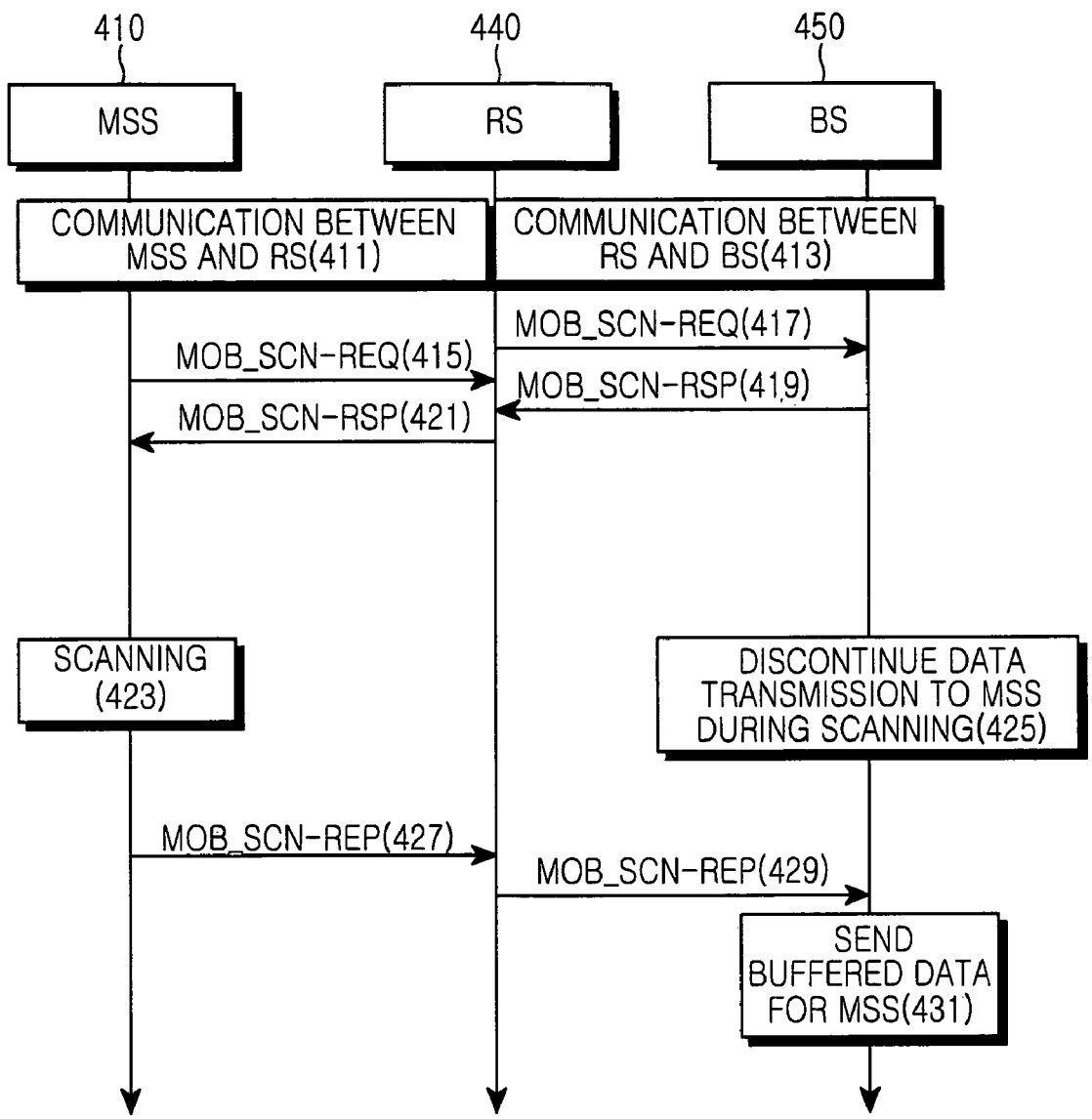
FIG. 4 is a diagram illustrating a signal flow among an MSS, an RS and a BS, for scanning in the multi-hop relay BWA communication system according to the present invention.

FIG. 4 shows a signal flow among an MSS, an RS and a BS, for scanning in the multi-hop relay BWA communication system according to the present invention.

Referring to FIG. 4, an MSS 410 communicates with an RS 440 in step 411 and the RS 440 communicates with a BS 450 in step 413. In this way, the MSS 410 communicates with the BS 450 not directly but by signals relayed by the RS 440.

When determining whether scanning should be performed during the communication with the RS 440, the MSS 410 sends a MOB_SCN-REQ message to the RS 440, requesting scanning of pilot channel signals from neighbor BSs including the serving BS 450 and neighbor RSs including the serving RS 440 in step 415. The MOB_SCN-REQ message has the following configuration illustrated in Table 4 below.

TABLE 4

| Syntax | Size (bits) | Notes |
|---|---|---|
| MOB_SCN-REQ_format( ) { | | |
| Management Message Type=54 | 8 | — |
| Scan duration | 8 | Units are frames |
| Interleaving interval | 8 | Units are frames |
| Scan iteration | 8 | In frames |
| N_Recommended | 8 | Number of neighboring RSs BSs to be scanned |
| For (i=0; i<N_Recommended; i++) { | | |
| Recommended Node_ID | 48 | BS Identifier or RS Identifier |
| } | | |
| } | | |

Referring to Table 4, the MOB_SCN-REQ message has a plurality of IEs. The IEs include "Management Message Type" identifying the type of the transmitted message, "Scan duration" indicating a desired scan duration during which pilot signals from the neighbor BSs and the neighbor RSs are scanned, "Scan iteration" indicating the number of iterative scannings in the case of periodic scanning, "Interleaving interval" indicating the time interval between scannings in the case of iterative scanning, and "Recommended Node_ID" identifying a desired BS or an RS to be scanned. The time when the MSS 410 requests scanning is beyond the scope of the present invention and thus its detailed description is not provided herein.

Upon receipt of the MOB_SCN-REQ message, the RS 440 relays it to the BS 450 in step 417. In step 419, the BS 450 replies to the RS 440 with a MOB_SCN-RSP message containing scanning information for the MSS 410 and a scan duration set to non-zero.

The MOB_SCN-RSP message has the following structure.

TABLE 5

| Syntax | Size (bits) | Notes |
|---|---|---|
| MOB_SCN-RSP_format( ) { | | |
| Management Message Type=55 | 8 | — |
| Scan duration | 8 | Units are frames. When Scan duration is set to zero, no scanning parameters are specified in the message. When MOB_SCN-RSP is sent in response to MOB_SCN-REQ, setting Scan duration to zero denies MOB_SCN-REQ. |
| Report mode | 2 | 0b00: no report<br>0b01: periodic report<br>0b10: event triggered report<br>0b11: reserved; shall be set to zero |
| reserved | 6 | Shall be set to zero |
| Report period | 8 | Available when the value of Report mode is set to 0b01. Report period in frames. |
| Report metric | 8 | Bitmap indicating metrics on which the corresponding triggers are based:<br>Bit 0: BS CINR mean<br>Bit 1: BS RSSI mean |

TABLE 5-continued

| Syntax | Size (bits) | Notes |
|---|---|---|
| | | Bit 2: Relative delay<br>Bit 3: BS RTD<br>Bit 4-7: reserved; shall be set to zero |
| If (Scan duration!=0) { | | |
| Start frame | 4 | — |
| reserved | 4 | Shall be set to zero |
| Interleaving interval | 8 | Duration in frames |
| Scan iteration | 8 | — |
| N_Recommended | 8 | Number of neighboring BSs or RSs to be scanned |
| for (i=0; i<N_Recommended; i++) { | | |
| Recommended Node_ID | 48 | BS Identifier or RS Identifier |
| } | | |
| } | | |
| } | | |

Referring to Table 5, the MOB_SCN-RSP message has a plurality of IEs. The IEs include "Management Message Type" identifying the type of the transmitted message, "Scan duration" indicating a scan duration during which the MSS is to scan, "Report mode", "Report period" used when the report mode is a periodic report, "Report metric" indicating the type of information to be reported as a scanning result, "Start frame" indicating the start of the scanning, "Scan iteration" indicating the number of iterative scannings in the case of periodic scanning, "Interleaving interval" indicating the time interval between scannings in the case of iterative scanning, and "Recommended Node_ID" identifying a BS or an RS to be scanned. If "Scan duration" is 0, it implies that the scanning request from the MSS is rejected. Information reported as a scanning result may be CINR, RSSI, relative delay, or RTD.

Upon receipt of the MOB_SCN-RSP message containing the scanning information, the RS 440 relays it to the MSS 410 in step 421. The MSS 410 then scans pilot channel signals from the neighbor BSs and the neighbor RSs in correspondence with the parameters included in the MOB_SCN-RSP message in step 423.

Meanwhile, the BS 450 discontinues data transmission to the MSS 410 during the scanning in step 425. At the same time, the BS 450 may buffer data destined for the MSS 410.

After the pilot scanning, the MSS 410 sends a MOB_SCN-REP message containing the scanning result to the RS 440 in step 427.

The MOB_SCN-REP message is configured in the following structure.

TABLE 6

| Syntax | Size (bits) | Notes |
|---|---|---|
| MOB_SCN-REP_format( ) { | | |
| Management Message Type=60 | 8 | — |
| Report mode | 1 | 0: Event triggered report<br>1: Periodic report |
| Reserved | 7 | Shall be set to zero |
| Report metric | 8 | Bitmap indicating presence of certain metrics:<br>Bit 0: BS CINR mean<br>Bit 1: BS RSSI mean<br>Bit 2: Relative delay<br>Bit 3: BS RTD<br>Bit 4-7: reserved; shall be set to zero |

TABLE 6-continued

| Syntax | Size (bits) | Notes |
|---|---|---|
| N_Node | 8 | Number of BSs or RSs to be scanned |
| for (i=0; i<N_Node; i++) { | | |
|   Node_ID | 48 | BS Identifier or RS Identifier |
|   Scanning result | 8 | This field contains the scanning result corresponding to Report metric (CINR/RSSI/Relative delay/RTD/etc. |
| } | | |
| } | | |

Referring to Table 6, the MOB_SCN-REP message has a plurality of IEs. The IEs include "Management Message Type" identifying the type of the transmitted message, "Report mode" indicating a mode in which the MSS reports the scanning result, "Report metric" indicating the type of information reported as a scanning result, "Node_ID" identifying a scanned node, and "Scanning result" indicating the scanning result for the node. The scanning result may be CINR, RSSI, relative delay, or RTD according to the value of "Report metric".

Meanwhile, the RS 440 relays the MOB_SCN-REP message to the BS 450 in step 429. In step 431, the BS 450 recognizes the scanning completion of the MSS 410 and sends the buffered data to the MSS 410.

If the MSS 410 completes the scanning earlier than scheduled in step 415 through step 421 and sends uplink data, the RS 440 and the BS 450 recognize the scanning completion by receiving the uplink data.

In FIG. 4, it is assumed that the RS 440 can acquire knowledge of the scanning operation of the MSS 410 and the scanning result from the scanning control messages illustrated in Table 4, Table 5 and Table 6 exchanged between the MSS 410 and the BS 450.

The operations of the RS and the BS in the procedure illustrated in FIG. 4 are further described below.

Figure 5:
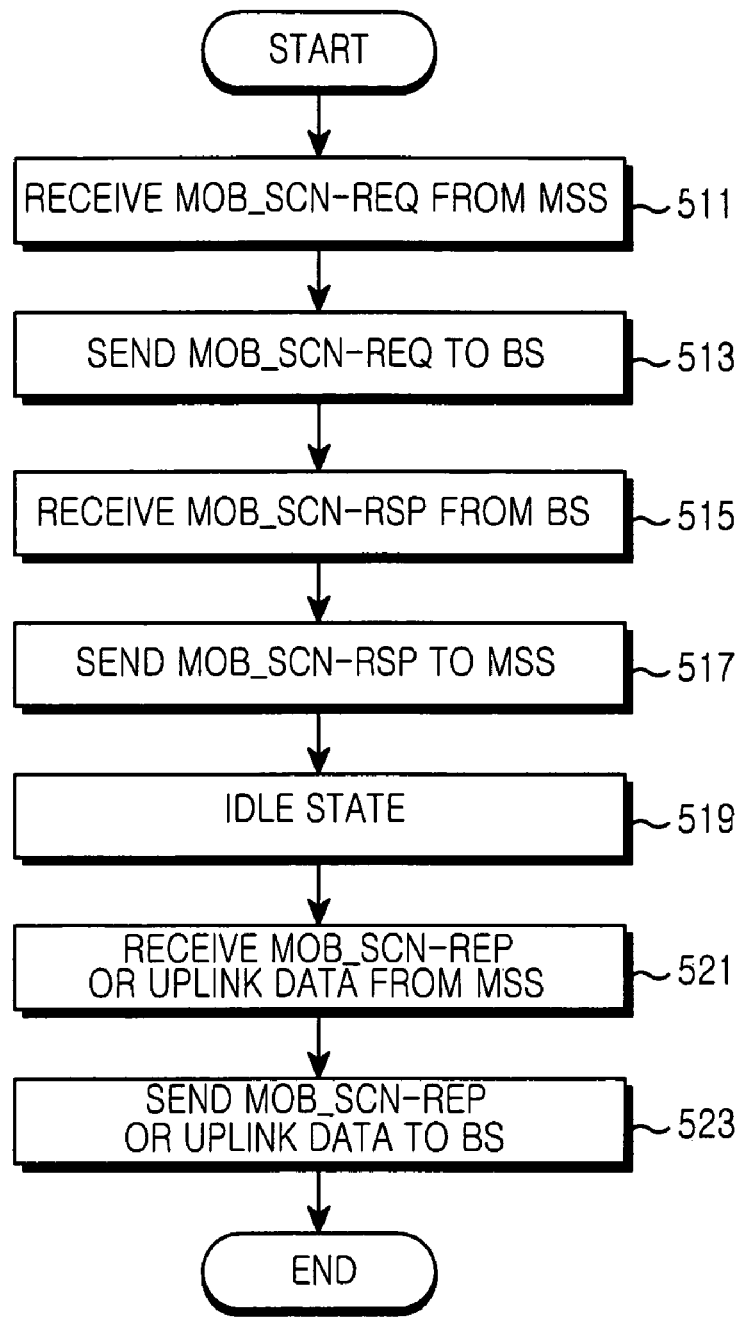
FIG. 5 is a flowchart illustrating an RS operation in the multi-hop relay BWA communication system according the present invention.

FIG. 5 shows the RS operation in the multi-hop relay BWA communication system according to the present invention.

The RS 440 receives the MOB_SCN-REQ message requesting scanning from the MSS 410 in step 511 and relays the MOB_SCN-REQ message to the BS 450 in step 513. The RS 440 receives the MOB_SCN-RSP message for the MOB_SCN-REQ message from the BS 450 in step 515 and relays it to the MSS 410 in step 517. Since the RS 440 can read the MOB_SCN-REQ message and the MOB_SCN-RSP message exchanged between the MSS 410 and the BS 450, it acquires information indicating whether the scanning will be performed and scanning schedule information.

Unless the MOB_SCN-RSP message contains information indicating the scanning is rejected, that is, the MSS 410 will perform scanning, the RS 440 is placed in an idle state in step 519. The RS 440 then receives the MOB_SCN-REP message reporting the scanning result or uplink data from the MSS 410 in step 521, thus recognizing completion of the MSS scanning. In step 523, the RS 440 relays the MOB_SCN-REP message or the uplink data to the BS 450.

If the MOB_SCN-RSP message contains information indicating the scanning is rejected, the RS 440 continues communications between the MSS 410 and the BS 450, determining that the scanning has been denied.

Figure 6:
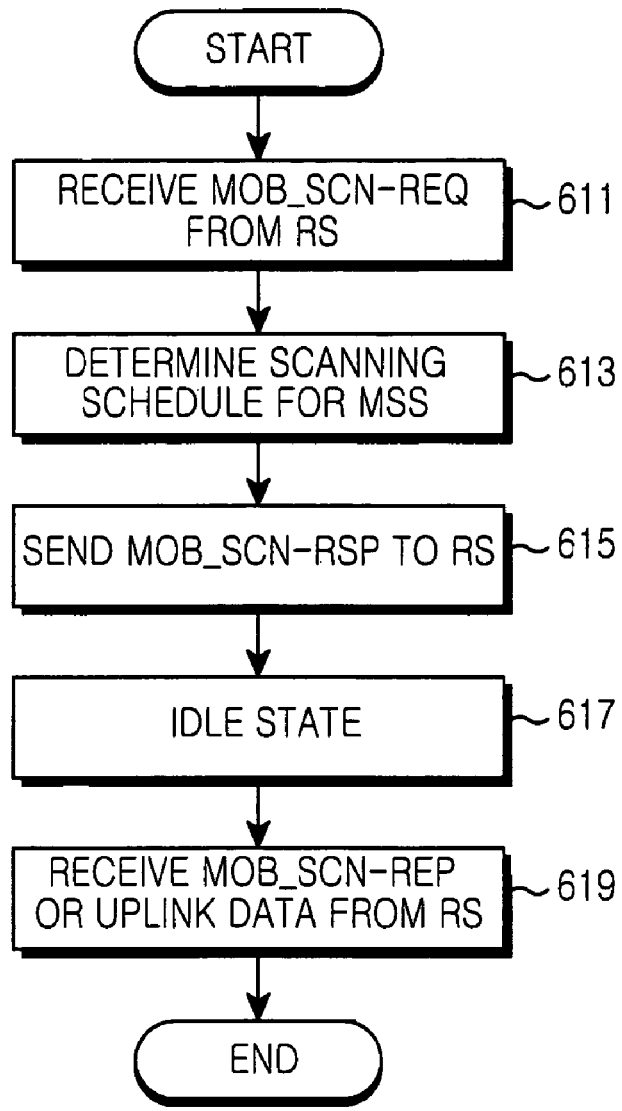
FIG. 6 is a flowchart illustrating a BS operation in the multi-hop relay BWA communication system according to the present invention.

FIG. 6 shows the BS operation in the multi-hop relay BWA communication system according to the present invention.

The BS 450 acquires scanning request information of the MSS 410 by receiving the MOB_SCN-REQ message from the RS 440 in step 611 and schedules a scanning for the MSS 410 based on the scanning request information in step 613.

In step 615, the BS 450 sends the MOB_SCN-RSP message containing scanning schedule information. When the scanning request from the MSS 410 is accepted as in this case, the BS 450 is placed in an idle state in step 617. If the BS 450 rejects the scanning request, it continues to communicate with the MSS 410 via the RS 440.

In step 619, the BS 450 monitors reception of the MOB_SCN-REP message or uplink data of the MSS 410 from the RS 440 in the idle state. Upon receipt of the MOB_SCN-REP message or uplink data, the BS 450 resumes communications with the MSS 410, determining that the scanning is completed and acquiring the scan result.

As shown in FIGS. 4, 5 and 6, the RS can interpret the scanning control messages exchanged between the MSS and the BS.

As described below, the RS may also not be able to interpret control messages between the MSS and the BS. Hence, the BS may notify the RS of information about a scanning operation and a scanning result of the MSS by separate signaling.

Figure 7:
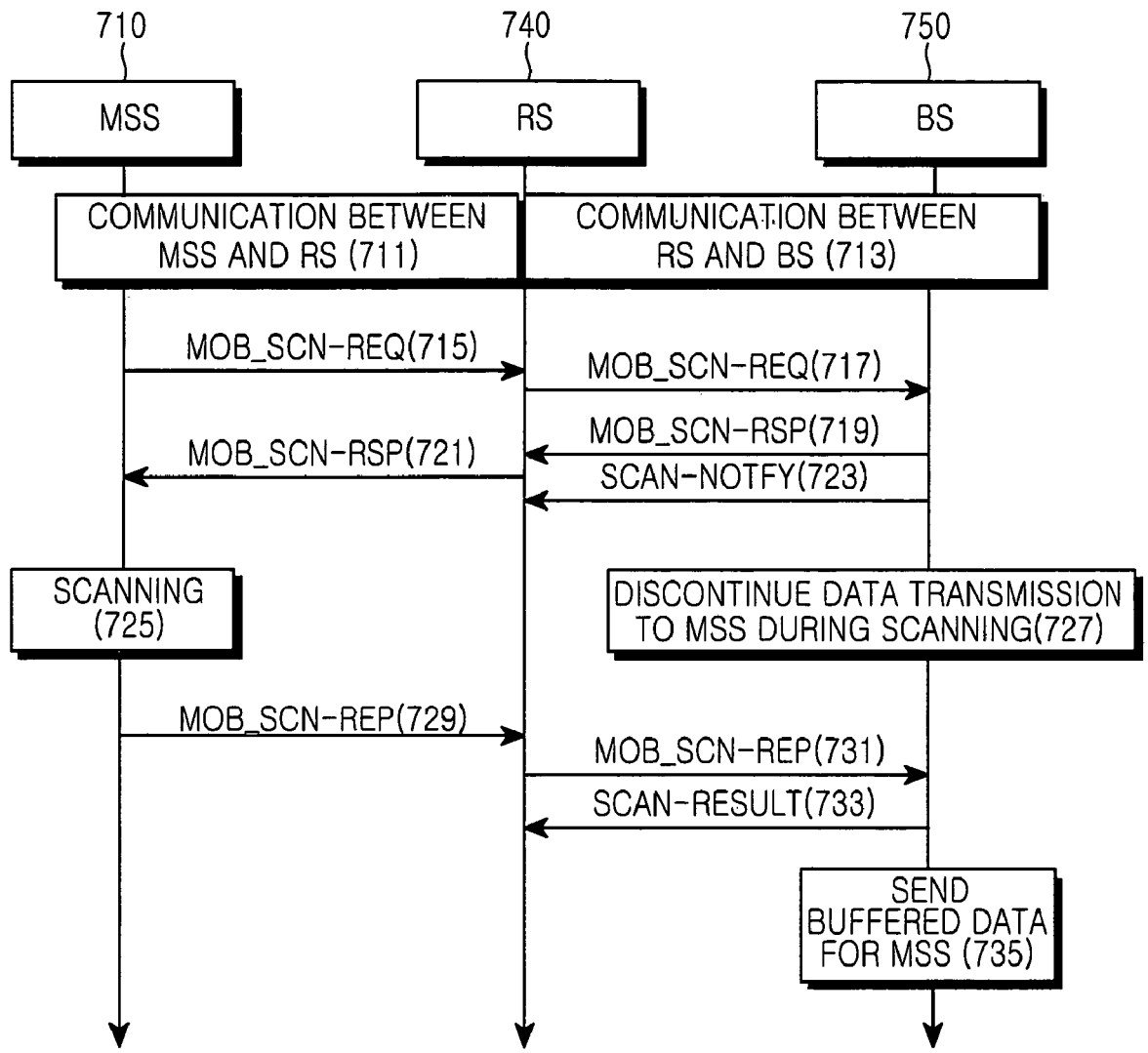
FIG. 7 is a diagram illustrating a signal flow among the MSS, the RS and the BS, for scanning in the multi-hop relay BWA communication system according to the present invention.

FIG. 7 shows a signal flow among the MSS, the RS and the BS, for scanning in the multi-hop relay BWA communication system according to the present invention.

An MSS 710 communicates with an RS 740 in step 711 and the RS 740 communicates with a BS 750 in step 713. In this way, the MSS 710 communicates with the BS 750 not directly but by signals relayed by the RS 740.

When determining whether scanning should be performed during the communication with the RS 740, the MSS 710 sends a MOB_SCN-REQ message having the configuration illustrated in Table 4 to the RS 740, requesting scanning of pilot channel signals from neighbor BSs including the serving BS 750 and neighbor RSs including the serving RS 740 in step 715. Upon receipt of the MOB_SCN-REQ message, the RS 740 relays it to the BS 750 in step 717. In step 719, the BS 450 replies to the RS 740 with a MOB_SCN-RSP message illustrated in Table 5 containing scanning information for the MSS 710 and a scan duration set to non-zero. Upon receipt of the MOB_SCN-RSP message containing the scanning information, the RS 740 relays it to the MSS 710 in step 721.

After sending the MOB_SCN-RSP message accepting the scanning request of the MSS 710, the BS 750 sends a SCAN-NOTIFY message to the RS 740, indicating that the MS 710 will scan.

The SCAN-NOTIFY message has the following configuration.

TABLE 7

| Syntax | Notes |
|---|---|
| SCAN-NOTIFY_format( ) { | |
|   MS ID | MS's identifier |
|   Scan duration | Units are frames. Time duration when MS performs scanning |
|   Start frame | First scanning interval start time |
|   Interleaving interval | Duration in frames The period interleaved between scanning intervals when MS shall perform normal operation |
|   Scanning iteration | The number of iterating scanning interval |
| } | |

Referring to Table 7, the SCAN-NOTIFY message has a plurality of IEs. The IEs include "MS ID" identifying the MSS that will scan, "Scan duration" indicating a time period for which the MSS will scan, "Start frame" indicating the start of the scanning, "Scan iteration" indicating the number of iterative scannings in the case of periodic scanning, and "Interleaving interval" indicating the time interval between scannings.

Meanwhile, upon receipt of the MOB_SCN-RSP message, the MSS 710 scans pilot channel signals from the neighbor BSs and the neighbor RSs in correspondence with the parameters included in the MOB_SCN-RSP message in step 725. The BS 750 discontinues data transmission to the MSS 710 during the scanning in step 727. At the same time, the BS 750 may buffer data destined for the MSS 710.

After the pilot scanning, the MSS 710 sends a MOB_SCN-REP message containing the scanning result to the RS 740 in step 729. The RS 740 relays the MOB_SCN-REP message to the BS 750 in step 731. The BS 750 recognizes the scanning completion of the MSS 710 by the MOB_SCN-REP message and sends a SCAN-RESULT message result to the RS 740 to notify the scanning completion and the scanning result in step 733.

The SCAN-RESULT message is configured as illustrated in Table 8 below.

TABLE 8

| Syntax | Notes |
|---|---|
| SCAN-RESULT_format( ) { | |
| MS ID | MS's identifier |
| Report metric | Bitmap indicating presence of certain metrics:<br>Bit 0: no scan result<br>Bit 1: CINR mean<br>Bit 2: RSSI mean<br>Bit 3: Relative delay<br>Bit 4-: RTD<br>Bit 5-: reserved, shall be set to zero<br>Note) Bit 0 = 1 indicates that this message does not contain MS's scanning result. When Bit 0 is set to 1, the remaining bits in this field shall be set to 0. Also, the remaining field in this message shall be discarded. |
| N_Node | Number of RSs or BSs to be scanned |
| for (i=0; i<N_Node; i++) { | |
| Node_ID | BS Identifier or RS identifier |
| Scanning result | This field contains the scanning result corresponding to Report metric (CINR/RSSI/Relative delay/RTD/etc.) |
| } | |

Referring to Table 8, the SCAN-RESULT message has a plurality of IEs. The IEs include "MS ID" identifying the MSS that has completed the scanning, "Report metric" indicating whether the scanning result of the MSS is included and indicating the type of information reported as the scanning result, "Node_ID" identifying a node that the MSS has scanned, and "Scanning result" indicating the scanning result for the node. The scanning result may be CINR, RSSI, relative delay or RTD depending on Report metric.

In step 735, the BS 750 sends data which was buffered for the MSS 710 during the scanning.

If the MSS 710 completes the scanning earlier than scheduled in step 715 through step 721 and sends uplink data, the BS 750 recognizes the scanning completion by receiving the uplink data. Then the BS 750 notifies the RS 740 of the completed scanning by sending the SCAN-RESULT message.

The operations of the RS and the BS shown in FIG. 7 are further described below.

Figure 8:
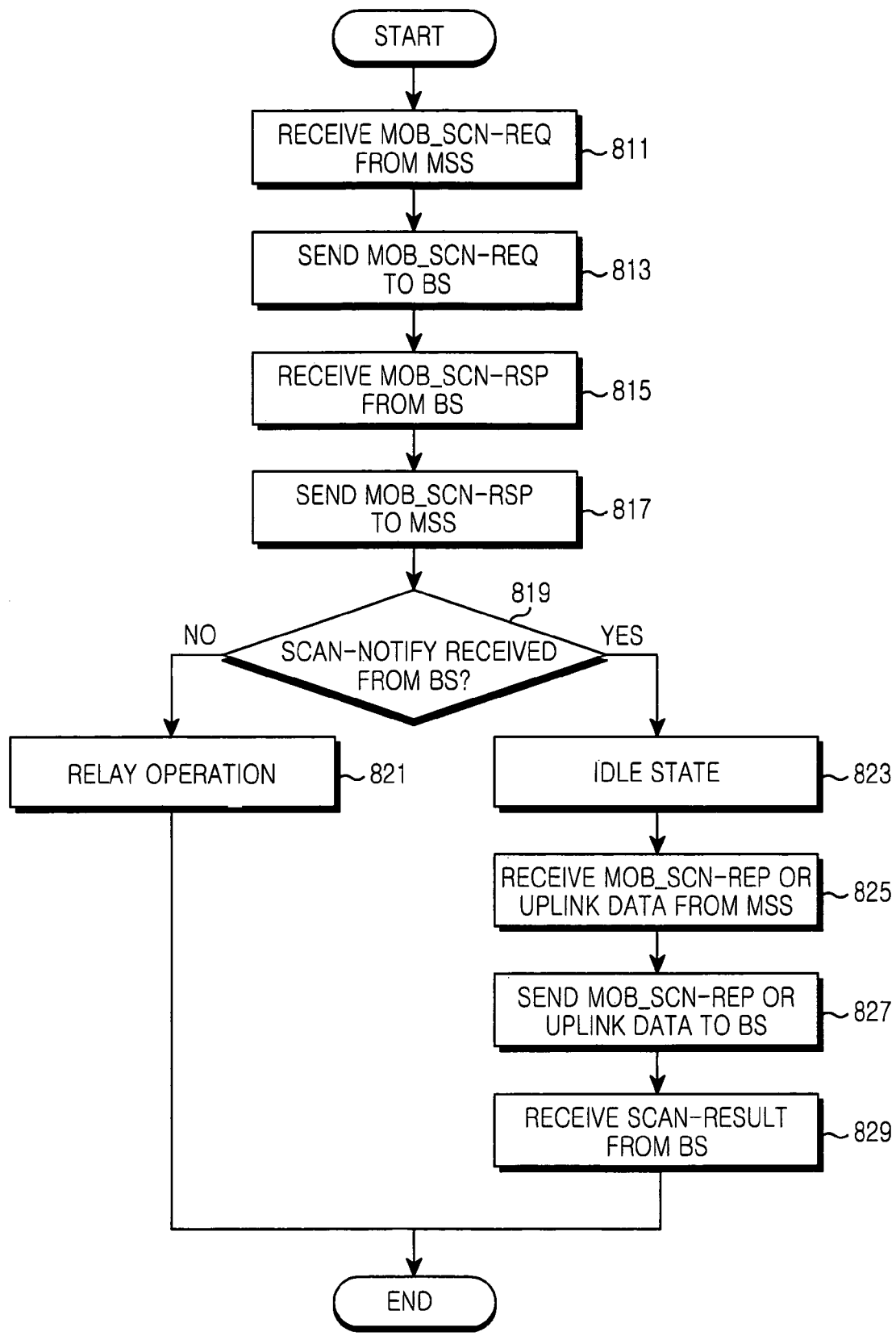
FIG. 8 is a flowchart illustrating an RS operation in the multi-hop relay BWA communication system according to the present invention.

FIG. 8 shows another RS operation in the multi-hop relay BWA communication system according to the present invention.

Referring to FIG. 8, the RS 740 receives the MOB_SCN-REQ message requesting scanning from the MSS 710 in step 811 and relays the MOB_SCN-REQ message to the BS 750 in step 813. The RS 740 receives the MOB_SCN-RSP message for the MOB_SCN-REQ message from the BS 750 in step 815 and relays it to the MSS 710 in step 817. Since the RS 440 cannot interpret the MOB_SCN-REQ message and the MOB_SCN-RSP message exchanged between the MSS 710 and the BS 750, it cannot determine whether the scanning will be performed.

In step 819, therefore, the RS 740 monitors reception of the SCAN-NOTIFY message indicating that the MSS 710 will scan from the BS 750. If the SCAN-NOTIFY message is not received, the RS 740 continues to relay data between the MSS 710 and the BS 750 in step 821. Upon receipt of the SCAN-NOTIFY message, the RS 740 recognizes that the MSS 710 will scan as scheduled and is placed into an idle state in step 823.

The RS 740 then receives the MOB_SCN-REP message reporting the scanning result or uplink data from the MSS 710 in step 825 and relays the MOB_SCN-REP message or the uplink data to the BS 750 in step 827. Since the RS 740 cannot interpret messages exchanged between the MSS 710 and the BS 750, it cannot recognize the scanning completion.

Hence, the RS 740 receives the SCAN-RESULT message containing information indicating the completed scanning and the scanning result from the BS 750, thus recognizing the scanning has been completed in step 829.

Figure 9:
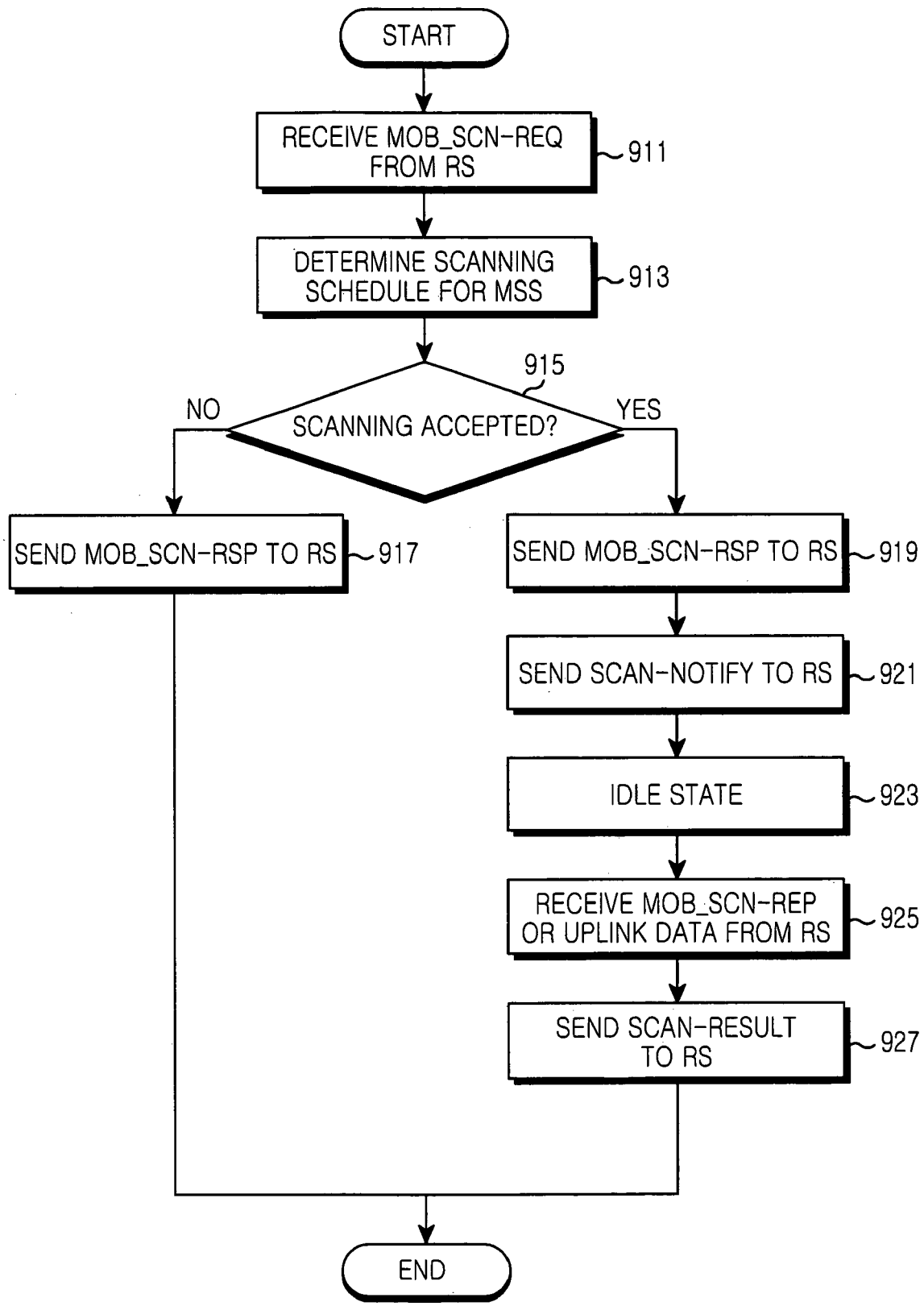
FIG. 9 is a flowchart illustrating a BS operation in the multi-hop relay BWA communication system according to the present invention.

FIG. 9 shows the BS operation in the multi-hop relay BWA communication system according to the present invention.

The BS 750 acquires scanning request information of the MSS 710 by receiving the MOB_SCN-REQ message from the RS 740 in step 911 and schedules a scanning for the MSS 710 based on the scanning request information in step 913.

In step 915, the BS 750 determines whether to accept the scanning request from the MSS 710. If the scanning result is rejected, the BS 750 sends the MOB_SCN-RSP message containing information indicating that the scanning request has been denied to the RS 740 in step 917.

When the scanning request from the MSS 710 is accepted, the BS 750 sends the MOB_SCN-RSP message containing scanning schedule information for the MSS 710 to the RS 740 in step 919. Since the RS 740 cannot interpret the MOB_SCN-RSP message, a message indicating that the MSS 710 will scan needs to be sent to the RS 740.

Thus, the BS 750 sends the SCAN-NOTIFY message indicating that the MSS 710 will scan to the RS 740 in step 921 and is placed in an idle state in step 923. At the same time, the BS 750 may discontinue data transmission to the MSS 710, while buffering data for the MSS 710.

In step 925, the BS 750 monitors reception of the MOB_SCN-REP message or uplink data of the MSS 710 from the RS 740 in the idle state. Upon receipt of the MOB_SCN-REP message or uplink data, the BS 750 resumes communications with the MSS 710, determining that the scanning is completed and acquiring the scanning result.

The BS 750 then sends the SCAN-RESULT message indicating the scanning completion and the scanning result of the MSS 710 to the RS 740.

While MSS-initiated scanning by sending the MOB_SCN-REQ message from the MSSs 410 and 710 has been described above, BS-initiated scanning can also be achieved in a similar manner by sending the MOB_SCN-RSP message without receiving the MOB_SCN-REQ message by the BSs 450 and 750.

In the case where the RS directly communicating with the MSS is able to control and schedule scanning at the MSS by processing the MOB_SCN-REQ message and the MOB_SCN-RSP message, there is no need for sending information for negotiating a scanning operation with the MSS to the BS which does not communicate directly with the MSS. This will be described in more detail.

Figure 10:
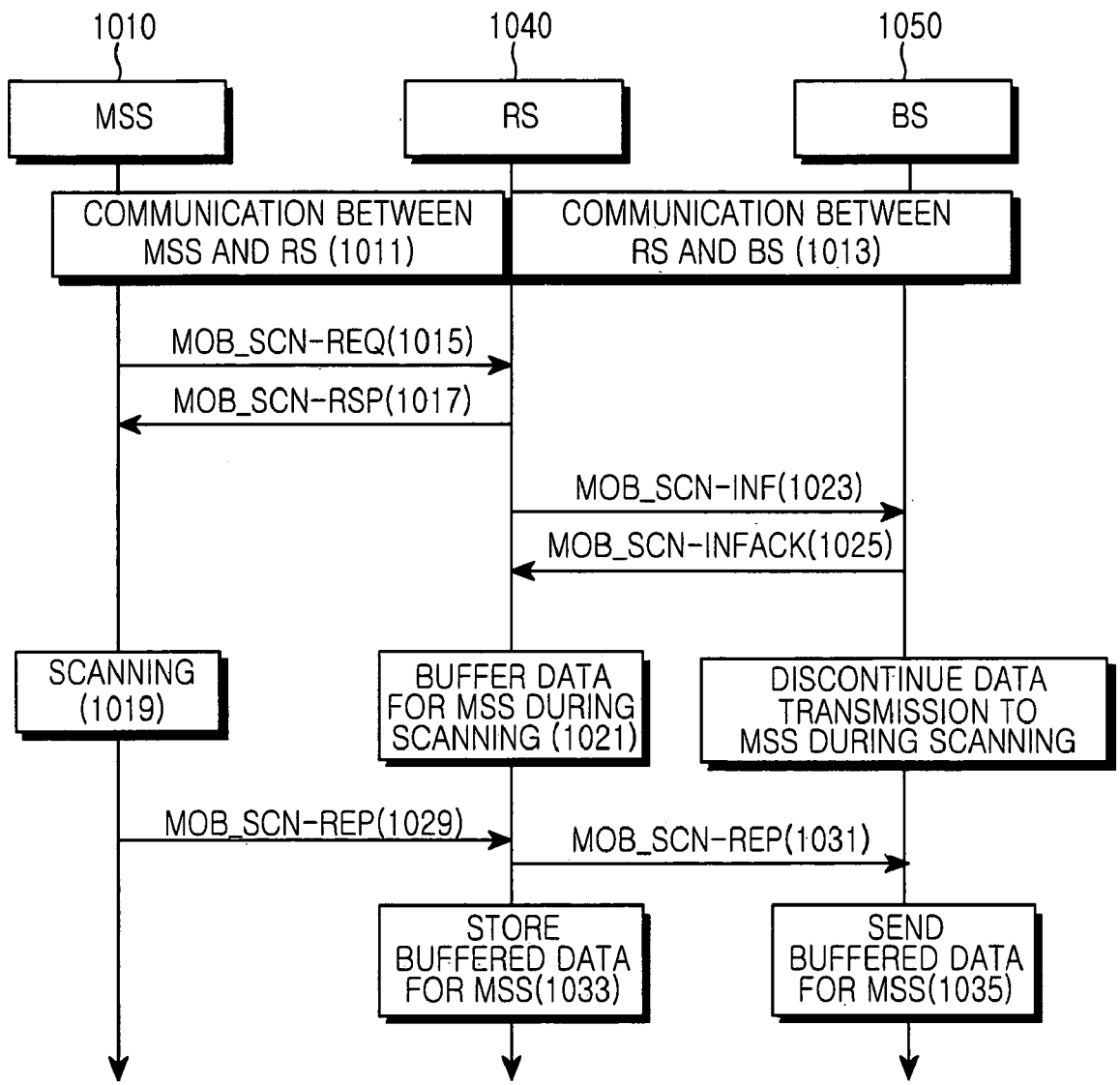
FIG. 10 is a diagram illustrating a signal flow among the MSS, the RS and the BS, for scanning in the multi-hop relay BWA communication system according to the present invention.

FIG. 10 shows another signal flow among the MSS, the RS and the BS, for scanning in the multi-hop relay BWA communication system according to the present invention.

An MSS 1010 communicates with an RS 1040 in step 1011 and the RS 1040 communicates with a BS 1050 in step 1013. In this way, the MSS 1010 communicates with the BS 1050 not directly but by signals relayed by the RS 1040.

When determining whether scanning should be performed during the communication with the RS 1040, the MSS 1010 sends a MOB_SCN-REQ message having the configuration illustrated in Table 4 to the RS 1040, requesting scanning of pilot channel signals from neighbor BSs including the serving BS 1050 and neighbor RSs including the serving RS 1040 in step 1015.

Upon receipt of the MOB_SCN-REQ message, the RS 1040 schedules scanning for the MSS 1010 and sends a MOB_SCN-RSP message containing scanning schedule information to the MSS 1010 in step 1017. Specifically, the MOB_SCN-RSP message is formatted as illustrated in Table 5 and includes information for scanning at the MSS 1010 and a scan duration set to non-zero. It is assumed herein that the RS 1140 acquires knowledge of neighbor BSs and neighbor RSs from a neighbor BS list broadcast by the BS 1150. Upon receipt of the MOB_SCN-RSP message, the MSS 1010 scans pilot channel signals from the neighbor BSs and the neighbor RSs in correspondence with the parameters included in the MOB_SCN-RSP message in step 1019.

Meanwhile, the RS 1040 discontinues data transmission to the MSS 1010 during the scanning in step 1021. At the same time, the RS 10410 may buffer data destined for the MSS 1010. To block data transmission from the BS 1050 to the MSS 1010, the RS 1040 sends a Mobile Scanning Inform (MOB_SCN-INF) message to the BS 1050, thus notifying that the MSS 1010 will scan in step 1023.

The MOB_SCN-INF message has the following configuration.

TABLE 9

| Syntax | Notes |
| --- | --- |
| MOB_SCN-INF_format ( ) { | |
| Management Message Type=TBD | To be determined |
| N_MS | Number of MSSs to perform scanning |
| for (i=0; i<N_MS< i++) { | |
| MSS ID | Identifier of MSS |
| Scan duration | Duration (in units of frames) where the MSS may perform scanning for available BS/RS |
| Start frame | Measured from the frame in which this message was received |

TABLE 9-continued

| Syntax | Notes |
| --- | --- |
| Interleaving interval | |
| Scan iteration | |
| reserved | Shall be set to zero |
| } | |
| } | |

Referring to Table 9, the MOB_SCN-INF message includes a plurality of IEs. The IEs contain "Management Message Type" identifying the type of the transmitted message, information about an MSS to perform scanning, and time-related parameters applied for the MSS to scan neighbor BSs and neighbor RSs. Since one or more MSSs can scan at the same time, information about these MSSs may be included in one MOB_SCN-INF message. The time-related parameters are "Scan duration" indicating a duration for which the MSS will scan, "Start frame" indicating the start of the scanning, "Scan iteration" indicating the number of iterative scannings in the case of periodic scanning, "Interleaving interval" indicating a time interval between scannings in the case of iterative scanning. In another case, the MOB_SCN-INF message may not contain the time-related parameters, or it may contain additional information besides the time-related parameters or part of the time-related parameters. The operation of the system according to the time-related parameters set in the MOB_SCN-INF message is beyond the cope of the present invention and will not be described.

Meanwhile, upon receipt of the MOB_SCN-INF message, the BS 1050 replies to the RS 1040 with a Mobile Scanning Inform Acknowledgement (MOB_SCN-INFACK) message indicating the reception of the MOB_SCN-INF message in step 1025.

The MOB_SCN-INFACK message is configured as illustrated in Table 10 below.

TABLE 10

| Syntax | Size (bits) | Notes |
| --- | --- | --- |
| MOB_SCN-INFACK_format ( ) { | | |
| Management Message Type=TBD | 8 | To be determined |
| N_MS | 8 | Number of MSSs to perform scanning |
| for (i=0; i<N_MS< i++) { | | |
| MSS ID | 48 | Identifier of MSS |
| } | | |
| } | | |

Referring to Table 10, the MOB_SCN-INFACK message includes a plurality of IEs. The IEs contain "Management Message Type" identifying the type of the transmitted message and the MSS information set in the MOB_SCN-INF message.

Meanwhile, the BS 1050 which has recognizes the MSS 1010 will scan discontinues data transmission to the MSS 1010, buffering data for the MSS 1010. The MSS 1010 scans pilot channel signals from the neighbor BSs and the neighbor RSs and sends a MOB_SCN-REP message containing the result of the scanning to the RS 1040 in step 1029.

The RS 1040 relays the MOB_SCN-REP message to the BS 1050 in step 1031. The message reporting the scanning result of the MSS 1010 sent from the RS 1040 to the BS 1050 is configured in a message format for transmission between the RS 1040 and the BS 1050. For example, the message may contain the contents of the MOB_SCN-REP message illustrated in Table 6, or it can be the SCAN-RESULT message illustrated in Table 8.

The RS 1040 sends the data buffered during the scanning to the MSS 1010 in step 1033. Meanwhile, upon receipt of the MOB_SCN-REP message, the BS 1050 recognizes the scanning completion of the MSS 1010 by the MOB_SCN-REP message and sends the data buffered for the MSS 1010 during the scanning in step 1035.

If the MSS 1010 completes the scanning earlier than scheduled in step 715 through step 721, it can resume communications by sending uplink data. In this case, the RS 1040 can recognize the scanning completion by receiving the uplink data from the MSS 1010. The RS 1040 relays the uplink data to the BS 1050 which thus recognizes that the scanning has been completed.

While MSS-initiated scanning by sending the MOB_SCN-REQ message from the MSS 1010 has been described above, the third embodiment is also applicable in the same manner for BS-initiated scanning by sending the MOB_SCN-RSP message to the MSS 1010 without receiving the MOB_SCN-REQ message by the BS 1050 or for RS-initiated scanning by sending the MOB_SCN-RSP message to the MSS 1010 without receiving the MOB_SCN-REQ message by the RS 1040.

In the case where the MSS does not report the scanning result after completing the scanning, the BS does not know the completed scanning. Therefore, the RS needs to notify the BS of the scanning completion. This will be described in more detail.

Figure 11:
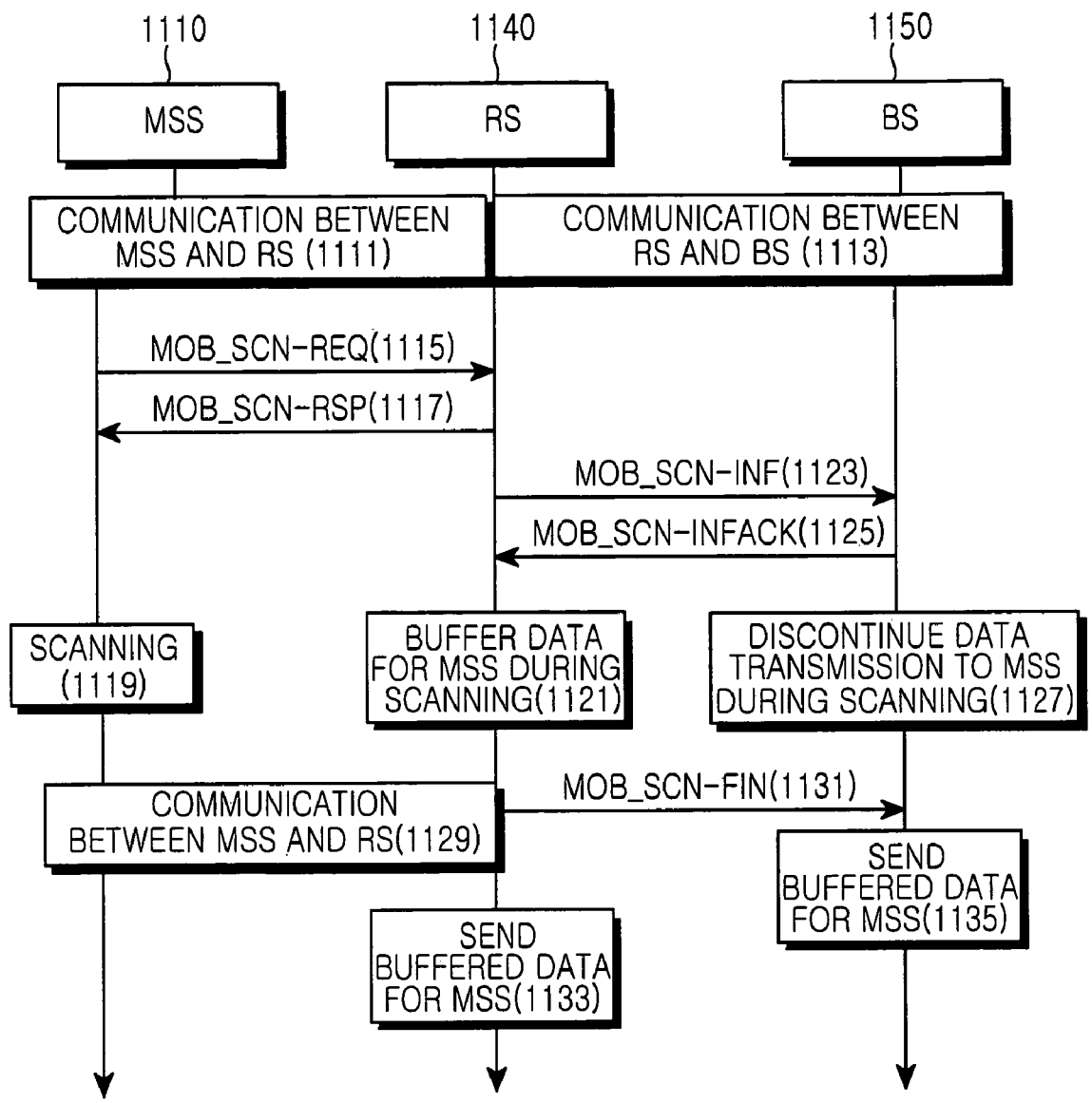
FIG. 11 is a diagram illustrating a signal flow among the MSS, the RS and the BS, for scanning in the multi-hop relay BWA communication system according to the present invention.

FIG. 11 shows another signal flow among the MSS, the RS and the BS, for scanning in the multi-hop relay BWA communication system according to the present invention.

An MSS 1110 communicates with an RS 1140 in step 1111 and the RS 1140 communicates with a BS 1150 in step 1113. In this way, the MSS 1110 communicates with the BS 1150 not directly but by signals relayed by the RS 1140.

When determining whether scanning should be performed during the communication with the RS 1140, the MSS 1110 sends a MOB_SCN-REQ message having the configuration illustrated in Table 4 to the RS 1140, requesting scanning of pilot channel signals from neighbor BSs including the serving BS 1150 and neighbor RSs including the serving RS 1140 in step 1115.

Upon receipt of the MOB_SCN-REQ message, the RS 1140 replies to the MSS 1110 with a MOB_SCN-RSP message illustrated in Table 5 containing scanning information for the MSS 1110 and a scan duration set to non-zero. Upon receipt of the MOB_SCN-RSP message containing the scanning information, the MSS 1110 scans pilot channel signals from the neighbor BSs and the neighbor RSs in correspondence with the parameters included in the MOB_SCN-RSP message in step 1119.

The RS 1140 discontinues data transmission to the MSS 1110 during the scanning in step 1121. At the same time, the RS 1150 may buffer data destined for the MS 1110.

To block data transmission from the BS 1150 to the MSS 1110, the RS 1140 sends a MOB_SCN-INF message illustrated in Table 9 to the BS 1150 in step 1123. Upon receipt of the MOB_SCN-INF message, the BS 1150 recognizes that the MSS 1010 will scan and replies to the RS 1140 with a MOB_SCN-INFACK message indicating the reception of the MOB_SCN-INF message in step 1125. In step 1127, the BS 1150 discontinues data transmission to the MSS 1110 during the scanning and buffers data for the MSS 1110.

The MSS 1110 scans pilot channel signals from the neighbor BSs and the neighbor RSs and determines whether to report the scanning result. If determining that it will not report the scanning result, the MSS 1110 immediately resumes communications with the RS 1140 in step 1129. The communication resumption may involve a periodic ranging procedure or an uplink bandwidth request procedure. These procedures have no direct relation to the subject matter of the present invention and thus they will not be described herein.

If the MSS 1110 resumes communications with the RS 1140 without sending a MOB_SCN-REP message, the RS 1140 recognizes that the scanning has been completed and sends a Mobile Scanning Finish (MOB_SCN-FIN) message to the BS 1150 to notify the completed scanning in step 1131. In step 1133, the RS 1140 sends the buffered data to the MSS 1110.

The MOB_SCN-FIN message has the following configuration.

TABLE 11

| Syntax | Notes |
| --- | --- |
| MOB_SCN-FIN_format ( ) { | |
|   Management Message Type=TBD | To be determined |
|   N_MS | Number of MSSs to finish scanning operation |
|   for (i=0; i<N_MS< i++) { | |
|     MSS ID | Identifier of MSS |
|   } | |
| } | |

Referring to Table 11, the MOB_SCN-FIN message includes a plurality of IEs. The IEs contain "Management Message Type" identifying the type of the transmitted message and information about an MSS which has finished scanning. The MOB_SCN-FIN message may contain information about a plurality of MSSs that have finished scanning.

Upon receipt of the MOB_SCN-FIN message, the BS 1150 recognizes that the MSS 110 has completed the scanning and sends the buffered data to the MSS 1110 in step 1135.

It is clear that the SCAN-RESULT message having the configuration illustrated in Table 8 can be sent instead of the MOB_SCN-FIN message illustrated in Table 11 as a message transmitted/received between the RS and the BS to notify the completed scanning of the MSS.

While MSS-initiated scanning by sending the MOB_SCN-REQ message from the MSSs 1010 and 1110 has been described above, RS-initiated scanning can also be achieved by sending the MOB_SCN-RSP message to the MSS 1010 without receiving the MOB_SCN-REQ message by the RSs 1040 and 1140, in the same manner except for step 1115 illustrated in FIG. 11.

The operations of the RS and the BS in the procedures illustrated in FIGS. 10 and 11 are further described below.

Figure 12:
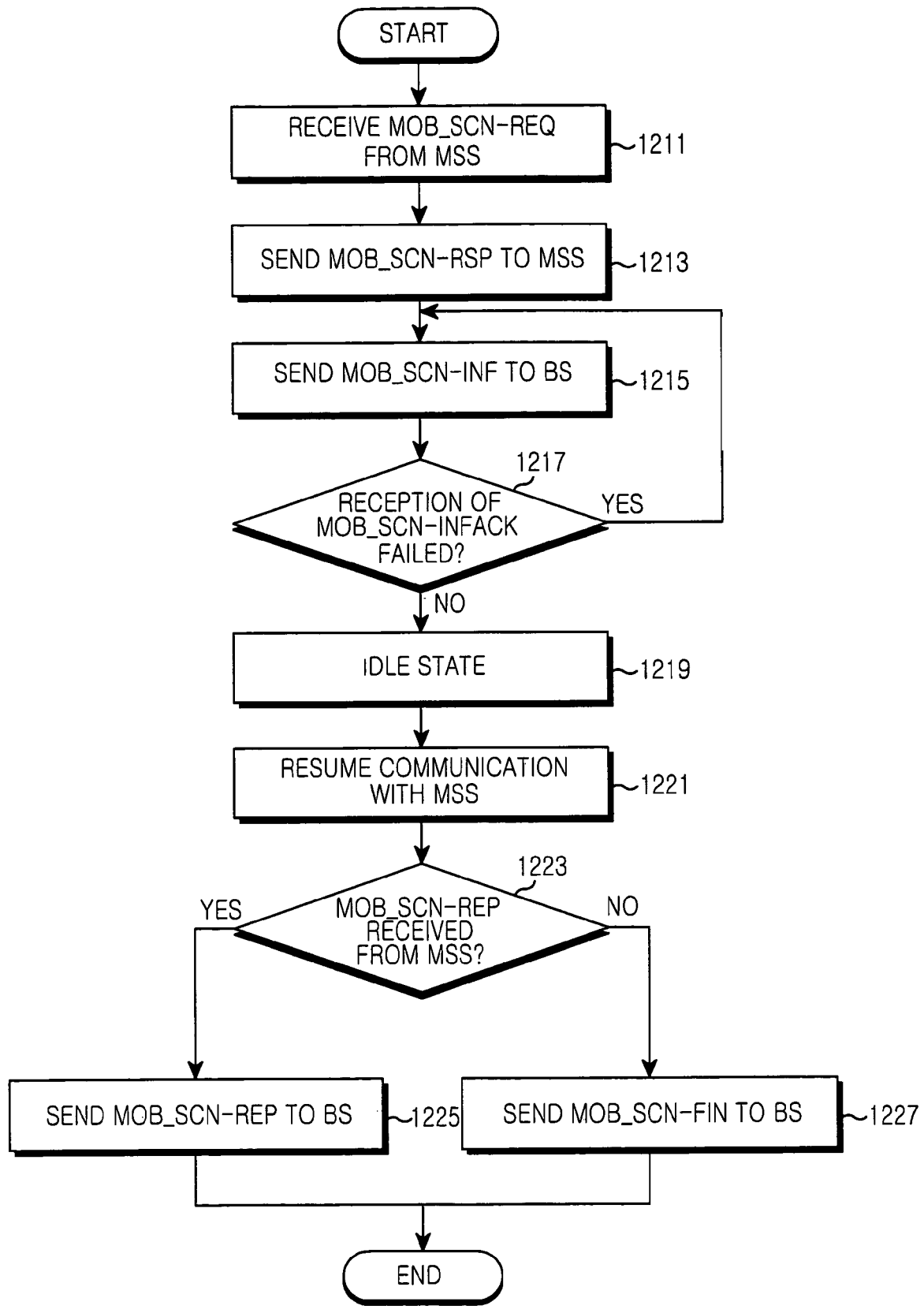
FIG. 12 is a flowchart illustrating an RS operation in the multi-hop relay BWA communication system according to the present invention.

FIG. 12 shows another RS operation in the multi-hop relay BWA communication system according to the present invention.

The RS receives the MOB_SCN-REQ message requesting scanning from the MSS in step 1211 and replies to the MSS with the MOB_SCN-RSP message containing scanning information in step 1213.

During scanning in the MSS, the RS discontinues data transmission to the MSS, buffering data for the MSS. In step 1215, the RS sends the MOB_SCN-INF message to the serving BS, notifying that the MSS will scan.

The RS monitors reception of the MOB_SCN-INFACK message from the BS within a predetermined time period in step 1217. If the MOB_SCN-INFACK message is not received within the predetermined time period, the RS retransmits the MOB_SCN-INF message in step 1215. The number of retransmissions allowed for the MOB_SCN-INF message and the predetermined time period can be set and changed by a system designer.

Upon receipt of the MOB_SCN-INFACK message within the predetermined time period, the RS performs a relay operation other than traffic transmission/reception to/from the MSS in step 1219. After the MSS completes the scanning, the RS resumes communications with the MSS in step 1221.

In step 1223, the RS monitors reception of the MOB_SCN-REP message containing the result of the scanning from the MSS. Upon receipt of the MOB_SCN-REP message, the RS relays it to the BS in step 1225. If the MOB_SCN-REP message is not received within a predetermined time period, the RS sends the MOB_SCN-FIN message to the BS, notifying that the scanning has been completed in step 1227.

Meanwhile, the RS may send the SCAN-RESULT message illustrated in Table 8 to the BS in order to notify the BS of the scanning result in step 1225 or the completed scanning in step 1227. If the RS receives uplink data instead of the MOB_SCN-REP message from the MSS in step 1223, it can relay the uplink data to the BS without sending a control message indicating the scanning completion.

Figure 13:
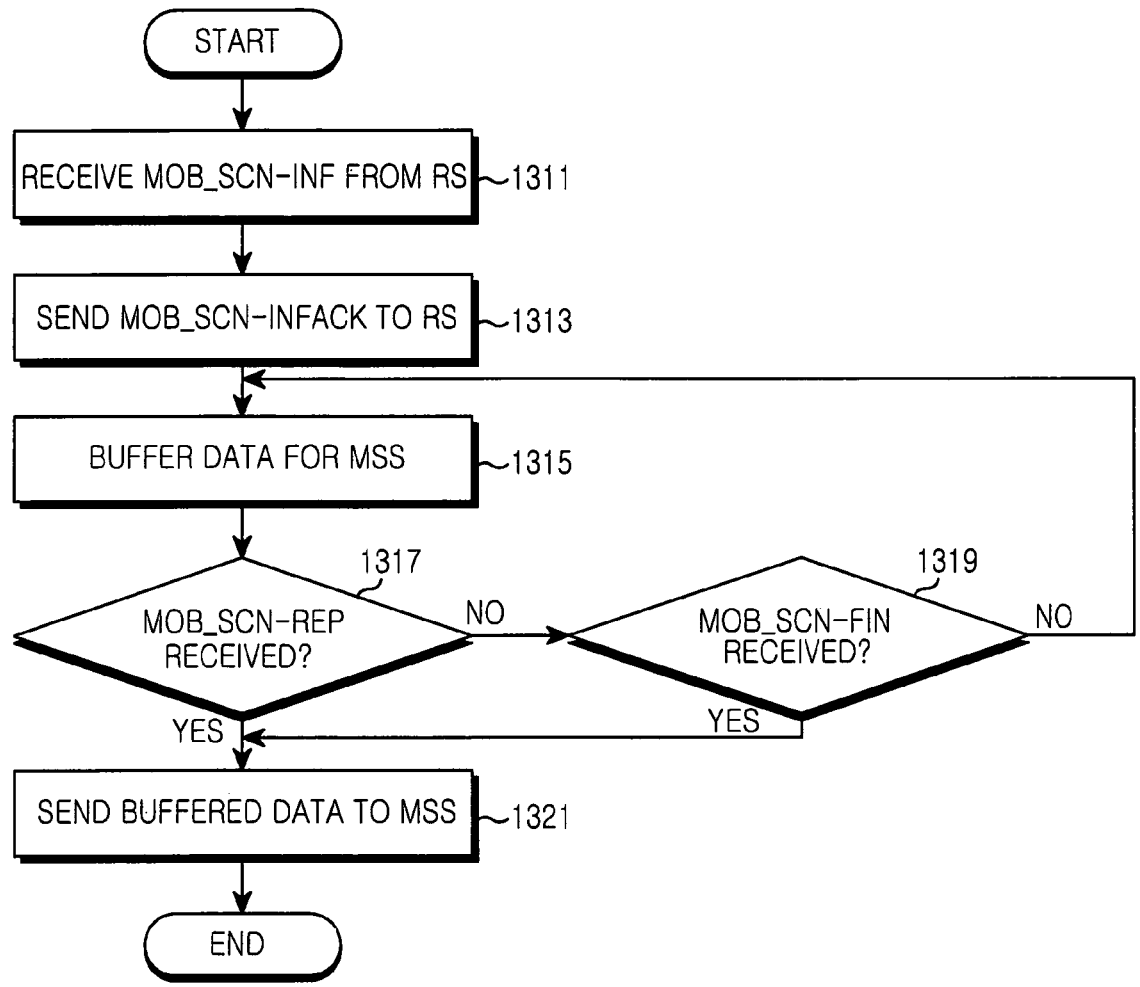
FIG. 13 is a flowchart illustrating a BS operation in the multi-hop relay BWA communication system according to the present invention.

FIG. 13 shows another BS operation in the multi-hop relay BWA communication system according to the present invention.

The BS receives the MOB_SCN-INF message indicating that scanning will be performed in at least one MSS from the RS in step 1311 and replies to the RS with the MOB_SCN-INFACK message in step 1313. In step 1315, the BS discontinues data transmission to the MSS, buffering data for the MSS.

During the buffering, the BS monitors reception of the MOB_SCN-REP message containing the result of the scanning from the RS. Upon receipt of the MOB_SCN-REP message, the BS recognizes that the scanning has been completed and sends the buffered data to the MSS in step 1321. The MOB_SCN-REP message received in step 1317 can be replaced by the SCAN-RESULT message illustrated in Table 3 containing the scanning result.

If the MOB_SCN-REP message is not received, the BS monitors reception of the MOB_SCN-FIN message indicating completion of the scanning in step 1319. If the MOB_SCN-FIN message is not received, the BS returns to step 1315. Upon receipt of the MOB_SCN-FIN message, the BS sends the buffered data to the MSS in step 1321. Obviously, the MOB_SCN-FIN message can be replaced by the SCAN-RESULT message illustrated in Table 3 indicating the scanning completion. Alternatively, the BS can recognize the completion of the scanning by receiving uplink data rather than receiving a control message indicating the completed scanning.

Figure 14:
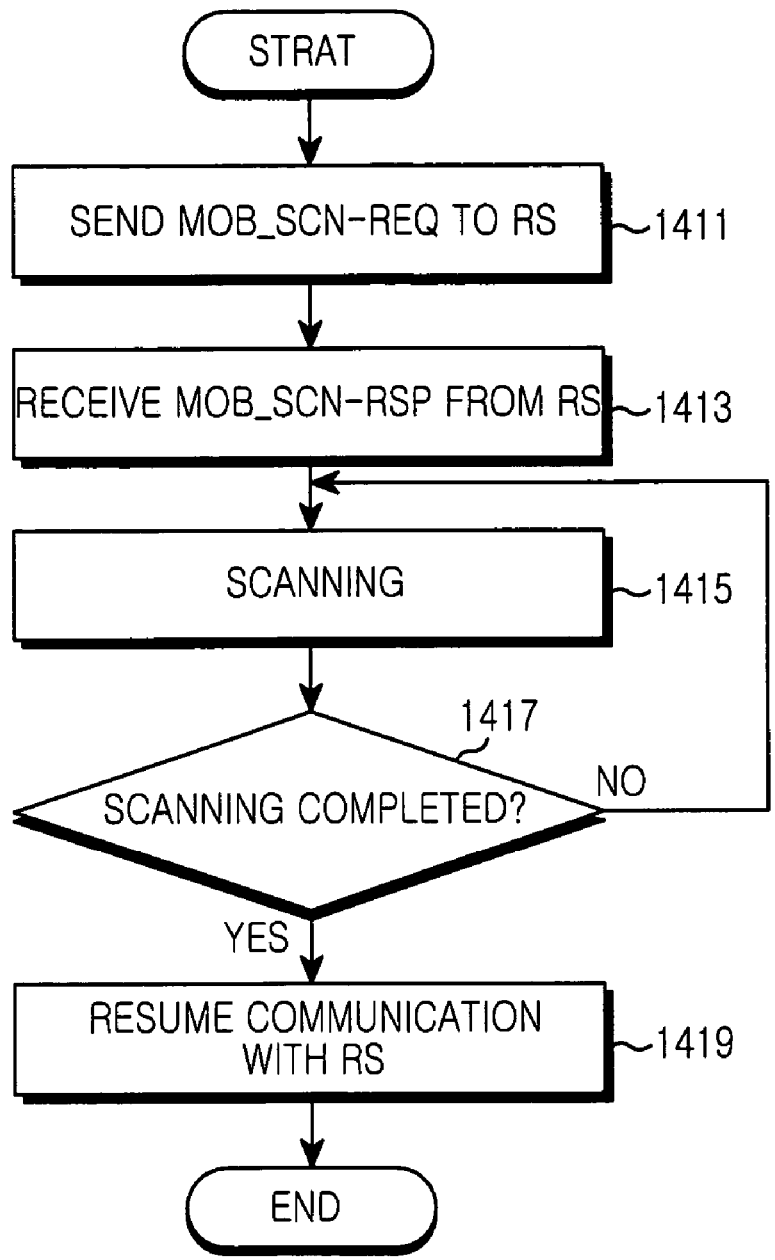
FIG. 14 is a flowchart illustrating a scanning operation in the MSS in the multi-hop relay BWA communication system according to the present invention.

FIG. 14 shows a scanning operation in the MSS in the multi-hop relay BWA communication system according to the present invention.

When determining whether scanning should be performed, the MSS sends the MOB_SCN-REQ message requesting scanning to the serving RS in step 1411. Upon receipt of the MOB_SCN-RSP message with a scan duration set to non-zero from the RS in step 1413, the MSS scans neighbor BSs including the serving BS and neighbor RSs including the serving RS in correspondence with parameters included in the MOB_SCN-RSP message in step 1415.

In step 1417, the MS determines whether the scanning has been completed. If the scanning has been completed, the MSS resumes communications with the serving RS in step 1419. For resuming communications, the MSS may send the MOB_SCN-REP message containing the scanning result to the RS or perform a predetermined communication procedure with the RS without transmitting the MOB_SCN-REP message.

Now a description will be made of the structures of the MSS, the RS and the BS. Since the MSS, the RS and the BS have identical interface modules (i.e. communication modules) and thus are configured in the same block structure, their operations will be described below with a single device.

Figure 15:
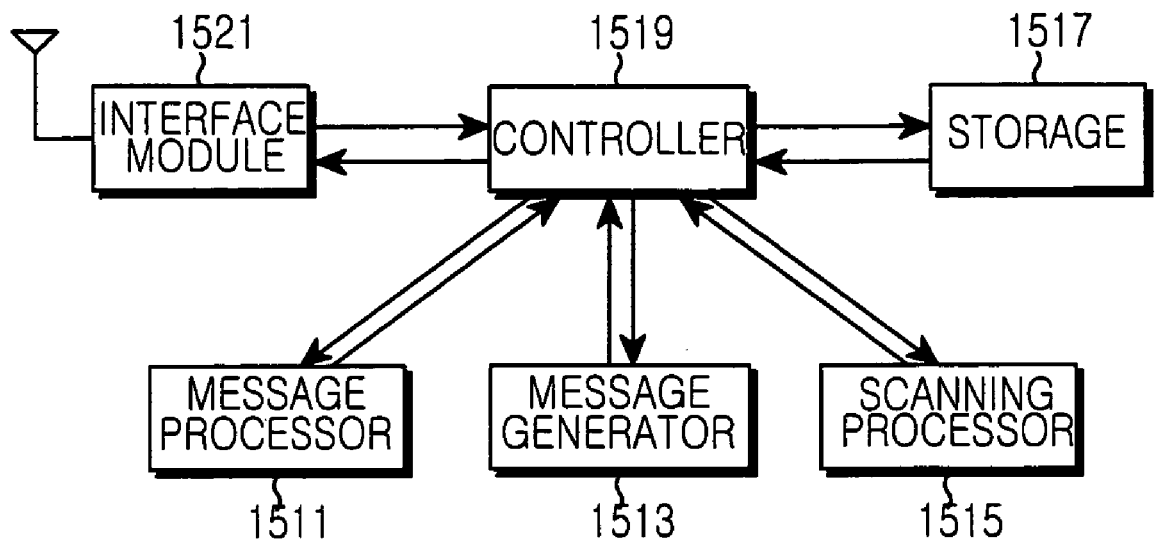
FIG. 15 is a block diagram of the MSS (the RS or the BS) according to the present invention.

FIG. 15 shows the MSS (the RS or the BS) according to the present invention. The following description is made mainly in the context of processing control messages.

An interface module 1521 is configured to communicate with the RS or the BS. It includes a Radio Frequency (RF) processor and a baseband processor. The RF processor down-converts a signal received through an antenna to a baseband signal and provides it to the baseband processor. It also upconverts a baseband signal received from the baseband processor to an RF signal for transmission in the air. For example, in the BWA system, the baseband processor acquires the original information data by Fast Fourier Transform (FFT)-processing and channel-decoding the signal received from the RF processor and provides the original information data to a controller 1519. The baseband processor also channel-encodes and Inverse Fast Fourier Transform (IFFT)-processes data received from the controller 1519 and provides the IFFT signal to the RF processor.

The controller 1519 provides overall control to the MSS. For example, the controller 1519 processes and controls voice communication and data communication. In addition to the typical functionalities, the controller 1519 processes the scanning of the MSS. The controller 1519 provides a control message received from the RS to a message processor 1511, and provides a transmission message for the RS received from the message generator 1513 to the interface module 1521.

A storage 1517 stores programs for controlling the overall operations of the MSS and temporary data generated during execution of the programs. That is, the storage 1517 can store data and control information that the MSS will send to the RS.

The message processor 1511 disassembles a control message received from the RS and notifies the controller 1519 of the disassembly result. According to the present invention, upon receipt of the MOB_SCN-RSP message having the configuration illustrated in Table 5, the message processor 1511 extracts control information from the MOB_SCN-RSP message and provides the control information to the controller 1519. The controller 1519 then controls a scanning processor 1515 based on the control information.

The scanning processor 1515 scans neighbor BSs and neighbor RSs in correspondence with parameters set in the MOB_SCN-RSP message under the control of the controller 1519 and collects scanning results. The controller 1519 provides the scanning results to a message generator 1513.

The message generator 1513 generates the MOB_SCN-REQ message illustrated in Table 4 or the MOB_SCN-REP message illustrated in table 6 containing the scanning results for transmission to the RS under the control of the controller 1519. The generated message is sent to the interface module 1521 via the controller 1519.

In the above MSS's configuration, the controller 1519 controls the message processor 1511, the message generator 1513, and the scanning processor 1515. In other words, the controller 1519 can perform the functions of the message processor 1511, the message generator 1513, and the scanning processor 1515. While the message processor 1511, the message generator 1513, and the scanning processor 1515 are shown separately in FIG. 15 for illustrative purposes, all or part of their functions may be incorporated into the controller 1519 in real implementation.

With reference to FIG. 15, the structure of the RS will be described.

The interface module 1521 is configured to communicate with the MSS or the BS. It includes the RF processor and the baseband processor. The RF processor downconverts a signal received through an antenna to a baseband signal and provides it to the baseband processor. It also upconverts a baseband signal received from the baseband processor to an RF signal for transmission in the air. For example, in the BWA system, the baseband processor acquires the original information data by FFT-processing and channel-decoding the signal received from the RF processor and provides the original information data to the controller 1519. The baseband processor also channel-encodes and IFFT-processes data received from the controller 1519 and provides the IFFT signal to the RF processor.

The controller 1519 provides overall control to the RS. For example, the controller 1519 processes and controls voice communication and data communication. In addition to the typical functionalities, the controller 1519 processes the scanning of the MSS according to the present invention. The controller 1519 provides a control message received from the MSS or the BS to the message processor 1511, and provides a transmission message for the MSS or the BS received from the message generator 1513 to the interface module 1521.

The storage 1517 stores programs for controlling the overall operations of the RS and temporary data generated during execution of the programs. That is, the storage 1517 can store data and control information that the RS will send to the MSS or the BS.

The message processor 1511 disassembles a control message received from the MSS or the BS and notifies the controller 1519 of the disassembly result. According to the present invention, upon receipt of the MOB_SCN-REQ message having the configuration illustrated in Table 4 and the MOB_SCN-REP message having the configuration illustrated in Table 6 from the MSS, or upon receipt of the MOB_SCN-RSP message having the configuration illustrated in Table 5 and the MOB_SCN-INFACK message having the configuration illustrated in Table 10, or the SCAN_NOTIFY message having the configuration illustrated in Table 7 and the SCAN_RESULT message having the configuration illustrated in Table 8 from the BS, the message processor 1511 extracts control information from the messages and provides the control information to the controller 1519. The controller 1519 operates correspondingly based on the control information.

The scanning processor 1515 manages MSSs that scan under the control of the controller 1519. It recognizes the MSS that scans, and processes discontinuation of data transmission to the MSS. The scanning processor 1515 also recognizes scanning completion in the MSS and processes resumed transmission of data buffered in the storage 1517 to the MSS.

The message generator 1513 generates the MOB_SCN-RSP message illustrated in Table 5 for transmission to the MSS under the control of the controller 1519 and provides it to the controller 1519. The message generator 1513 also generates the MOB_SCN-REP message illustrated in Table 4, the MOB_SCN-REP message illustrated in Table 6, the MOB_SCN-INF message illustrated in Table 9, and the MOB_SCN-FIN message illustrated in Table 11 for transmission to the BS and provides them to the controller 1519. The messages generated from the message generator 1513 are provided to the interface module 1521 via the controller 1519.

In the above RS's configuration, the controller 1519 controls the message processor 1511, the message generator 1513, and the scanning processor 1515. In other words, the controller 1519 can perform the functions of the message processor 1511, the message generator 1513, and the scanning processor 1515. While the message processor 1511, the message generator 1513, and the scanning processor 1515 are shown separately in FIG. 15 for illustrative purposes, all or part of their functions may be incorporated into the controller 1519 in real implementation.

With reference to FIG. 15, the structure of the BS will be described.

The interface module 1521 is configured to communicate with the MSS or the RS. It includes the RF processor and the baseband processor. The RF processor downconverts a signal received through an antenna to a baseband signal and provides it to the baseband processor. It also upconverts a baseband signal received from the baseband processor to an RF signal for transmission in the air. For example, in the BWA system, the baseband processor acquires the original information data by FFT-processing and channel-decoding the signal received from the RF processor and provides the original information data to the controller 1519. The baseband processor also channel-encodes and IFFT-processes data received from the controller 1519 and provides the IFFT signal to the RF processor.

The controller 1519 provides overall control to the BS. For example, the controller 1519 processes and controls voice communication and data communication. In addition to the typical functionalities, the controller 1519 processes the scanning of the MSS according to the present invention. The controller 1519 provides a control message received from the MSS or the RS to the message processor 1511, and provides a transmission message for the MSS or the RS received from the message generator 1513 to the interface module 1521.

The storage 1517 stores programs for controlling the overall operations of the BS and temporary data generated during execution of the programs. That is, the storage 1517 can store data and control information that the BS will send to the MSS or the RS.

The message processor 1511 disassembles a control message received from the MSS or the RS and notifies the controller 1519 of the disassembly result. According to the present invention, upon receipt of the MOB_SCN-REQ message having the configuration illustrated in Table 4, the MOB_SCN-REP message having the configuration illustrated in Table 6, the MOB_SCN-INF message having the configuration illustrated in Table 9, and the MOB_SCN-FIN message having the configuration illustrated in Table 11 from the RS, the message processor 1511 extracts control information from the messages and provides the control information to the controller 1519. The controller 1519 operates correspondingly based on the control information.

The scanning processor 1515 manages MSSs that scan under the control of the controller 1519. It recognizes the MSS that scans, and processes discontinuation of data transmission to the MSS. The scanning processor 1515 also recognizes scanning completion in the MSS and processes resumed transmission of data buffered in the storage 1517 to the MSS.

The message generator 1513 generates a message for transmission to the MSS or the RS under the control of the controller 1519 and provides it to the controller 1519. According to the present invention, the message generator 1513 generates the MOB_SCN-RSP message illustrated in Table 5, the MOB_SCN-INFACK message illustrated in Table 10, the SCAN-NOTIFY message illustrated in Table 7, or the SCAN-RESULT message illustrated in Table 8 for transmission to the RS and provides the generated message to the controller 1519. The message generated from the message generator 1513 is provided to the interface module 1521 via the controller 1519.

In the above BS's configuration, the controller 1519 controls the message processor 1511, the message generator 1513, and the scanning processor 1515. In other words, the controller 1519 can perform the functions of the message processor 1511, the message generator 1513, and the scanning processor 1515. While the message processor 1511, the message generator 1513, and the scanning processor 1515 are shown separately in FIG. 15 for illustrative purposes, all or part of their functions may be incorporated into the controller 1519 in real implementation.

In the multi-hop relay BWA communication system, scanning can MS-initiated by sending the MOB_SCN-REQ message by the MSS, RS-initiated by sending the MOB_SCN-RSP message to the MSS by the RS without receiving the MOB_SCN-REQ message from the MSS, or BS-initiated by sending the MOB_SCN-RSP message to the MSS by the BS. The RS-initiated scanning can be performed in the same manner as the MSS-initiated scanning except for transmission of the MOB_SCN-REQ message from the MSS to the RS and relay of the MOB_SCN-REQ message from the RS to the BS. The BS-initiated scanning can be performed in the same manner as the MSS-initiated scanning except for transmission of the MOB_SCN-REQ message from the MSS via the RS.

As described above, the present invention uses an RS that can provide a multi-hop relay path between an MSS and a BS in the case where a direct link between the MSS and the BS is in a bad channel state in an OFDM/OFDMA BWA communication system, such that the same services and functions can be provided to the MSS via the RS as if the MSS were communicating with the BS on the direct link. Also, the RS relays only necessary signals between the MSS and the BS by selective signaling in providing the services and performing the functions between the MSS and the BS, thereby preventing a waste of radio link channel resources. The present invention advantageously narrows the difference between systems which might be caused by separate signaling between the RS and the MSS and between the RS and the BS, and synchronizes the timings of system operations.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A communication method in a Relay Station (RS) in a cellular communication system, comprising:
   transmitting a scan request message received from a Mobile Subscriber Station (MSS) to a Base Station (BS);
   transmitting a scan response message received from the BS to the MSS, the scan response message containing information for scanning the MSS;
   receiving a scan notify message indicating the scanning of the MSS from the BS;
   receiving a scan report message containing a scanning result from the MSS;
   transmitting the scan report message to the BS; and
   receiving a scan result message indicating the scanning result of the MSS from the BS.

2. The communication method of claim 1, wherein the scan request message includes information about desired neighbor BSs and neighbor RSs to be scanned.

3. The communication method of claim 1, wherein the scan response message includes at least one of a scan duration, a scan report mode, a scan report period, the type of information reported as a scanning result, a scan start time, a scan iteration number, a time interval between scannings, and information about neighbor BSs and neighbor RSs to be scanned.

4. The communication method of claim 1, wherein the scan notify message includes at least one of an MSS Identifier (ID), a scan duration, a scan start time, a scan iteration number, and a time interval between scannings.

5. The communication method of claim 1, wherein the scan report message includes at least one of a scan report mode, the type of information reported as the scanning result, information about scanned neighbor BSs and neighbor RSs, and scanning result information.

6. The communication method of claim 5, wherein the scanning result information is one of Carrier-to-Interference and Noise Ratio (CINR), Received Signal Strength Indicator (RSSI), and a delay.

7. The communication method of claim 1, wherein the scan result message includes at least one of an MSS ID, the IDs of nodes that the MSS has scanned, and scanning result information.

8. A communication method in a Relay Station (RS) in a cellular communication system, comprising:
   determining, upon receipt of a scan request message from a Mobile Subscriber Station (MSS), a scanning schedule for the MSS based on information included in the scan request message;
   transmitting a scan response message including the determined scanning schedule information to the MSS;
   transmitting a scanning-inform-message indicating the scanning of the MSS to the BS;
   receiving a scanning-inform-acknowledge-message indicating reception of the scanning-inform-message from the BS;
   receiving a scan report message containing a scanning result from the MSS;
   generating a report message reporting information included in the scan report message; and
   transmitting the report message to the BS.

9. The communication method of claim 8, wherein the scan request message includes information about desired neighbor BSs and neighbor RSs to be scanned.

10. The communication method of claim 8, wherein the scan response message includes at least one of a scan duration, a scan report mode, a scan report period, the type of information reported as a scanning result, a scan start time, a scan iteration number, a time interval between scannings, and information about neighbor BSs and neighbor RSs to be scanned.

11. The communication method of claim 8, wherein the scan notify message includes at least one MSS that is to scan.

12. The communication method of claim 8, further comprising buffering data to be transmitted to the MSS, during the scanning in the MSS.

13. The communication method of claim 8, wherein the scan report message includes at least one of a scan report mode, the type of information reported as the scanning result, information about scanned neighbor BSs and neighbor RSs, and scanning result information.

14. A communication method in a Relay Station (RS) in a cellular communication system, the method comprising:

determining, upon receipt of a scan request message from a Mobile Subscriber Station (MSS), a scanning schedule for the MSS based on information included in the scan request message;

transmitting a scan response message including the determined scanning schedule information to the MSS;

transmitting a scanning-inform-message indicating the scanning of the MSS to the BS;

receiving a scanning-inform-acknowledge-message indicating reception of the scanning-inform-message from the BS;

discontinuing communication with the MSS during the scanning in the MSS; and transmitting a scanning-finish-message indicating completion of the scanning to a serving BS, when communication with the MSS resumes.

15. The communication method of claim 14, wherein the scan finish message includes information about at least one MSS that has completed scanning.

16. A communication method in a Base Station (BS) in a cellular communication system, comprising:

receiving a scan request message of a Mobile Subscriber Station (MSS) from a Relay Station (RS);

determining a scanning schedule for the MSS based on information included in the scan request message;

transmitting a scan response message containing the determined scanning schedule information to the MSS via the RS;

transmitting a scan notify message indicating the scanning of the MSS to the RS;

receiving a scan report message including a scanning result from the MSS; and transmitting a scan result message indicating the scanning result of the MSS to the RS.

17. The communication method of claim 16, wherein the scan notify message includes at least one of an MSS Identifier (ID), a scan duration, a scan start time, a scan iteration number, and a time interval between scannings.

18. The communication method of claim 16, further comprising transmitting data buffered during the scanning in the MSS to the MSS via the RS, when receiving the scan report message.

19. The communication method of claim 16, wherein the scan result message includes at least one of an MSS ID, the IDs of nodes that the MSS has scanned, and scanning result information.

20. A scanning method in a cellular communication system, comprising:

transmitting a scan request message requesting scanning to a Base Station (BS) via a Relay Station (RS) by a Mobile Subscriber Station (MSS);

transmitting a scan response message containing information for scanning of the MSS to the MSS via the RS by the BS;

transmitting a scan notify message indicating the scanning of the MSS to the RS by the BS;

scanning neighbor BSs and neighbor RSs according to information included in the scan response message by the MSS;

transmitting a scan report message containing a scanning result to the BS via the RS by the MSS; and transmitting a scan result message indicating the scanning result to the RS by the BS.

21. The scanning method of claim 20, wherein the scan notify message includes at least one of an MSS Identifier (ID), a scan duration, a scan start time, a scan iteration number, and a time interval between scannings.

22. The scanning method of claim 20, further comprising transmitting data buffered during the scanning in the MSS to the MSS via the RS by the BS.

23. The scanning method of claim 20 wherein the scan result message includes at least one of an MSS ID, the IDs of nodes that the MSS has scanned, and scanning result information.

24. A scanning method in a cellular communication system, comprising;

transmitting a scan request message requesting scanning to a Relay Station (RS) by a Mobile Subscriber Station (MSS);

transmitting a scan response message containing information for scanning of the MSS to the MSS by the RS; and transmitting a scanning-inform-message indicating the scanning of the MSS to the BS by the RS;

transmitting a scanning-inform-acknowledge-message indicating reception of the scanning-inform-message to the RS by the BS;

scanning neighbor BSs and neighbor RSs according to information included in the scan response message by the MSS;

transmitting a scan report message including a scanning result to the RS by the MSS;

generating a report message reporting information included in the scan report message; and transmitting the report message to the BS by the RS.

25. The scanning method of claim 24, wherein the scanning-inform-acknowledge-message includes information about at least one MSS that performs scanning.

26. The scanning method of claim 24, further comprising transmitting data buffered during the scanning in the MSS to the MSS by the RS.

27. The scanning method of claim 24, further comprising transmitting data buffered during the scanning in the MSS to the RS by the BS.

28. A scanning method in a cellular communication system, comprising:

transmitting a scan request message requesting scanning to a Relay Station (RS) by a Mobile Subscriber Station (MSS);

transmitting a scan response message containing information for scanning of the MSS to the MSS by the RS;

transmitting a scanning-inform-message indicating the scanning of the MSS to the BS by the RS;

scanning neighbor BSs and neighbor RSs according to information included in the scan response message by the MSS; and transmitting a scanning-finish-message indicating a completion of the scanning to the BS by the RS.

29. The scanning method of claim 28, wherein the scanning-finish-message includes information about at least one MSS that has completed scanning.

* * * * *

UNITED STATES PATENT AND TRADEMARK OFFICE
CERTIFICATE OF CORRECTION

PATENT NO. : 7,668,504 B2 Page 1 of 1
APPLICATION NO. : 11/519610
DATED : February 23, 2010
INVENTOR(S) : Kang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 680 days.

Signed and Sealed this

Twenty-eighth Day of December, 2010

David J. Kappos
*Director of the United States Patent and Trademark Office*